United States Patent
Kataoka et al.

(10) Patent No.: US 7,587,339 B2
(45) Date of Patent: Sep. 8, 2009

(54) SYSTEMS, METHODS, AND COMPUTER READABLE MEDIUM FOR PROVIDING A SITE FOR SELLING A PRODUCT IN RESPONSE TO A REQUEST FROM A TERMINAL

(75) Inventors: Keisuke Kataoka, Kanagawa (JP); Atsushi Hanai, Kanagawa (JP); Sachiko Misumi, Tokyo (JP); Eiji Shinohara, Kanagawa (JP); Shizuo Kamimura, Chiba (JP); Tatsuto Torikai, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 116 days.

(21) Appl. No.: 10/496,106

(22) PCT Filed: Nov. 20, 2002

(86) PCT No.: PCT/JP02/12104
§ 371 (c)(1),
(2), (4) Date: Oct. 6, 2004

(87) PCT Pub. No.: WO03/044708
PCT Pub. Date: May 30, 2003

(65) Prior Publication Data
US 2005/0049925 A1    Mar. 3, 2005

(30) Foreign Application Priority Data
Nov. 21, 2001    (JP) .............................. 2001-356691

(51) Int. Cl.
*G06Q 30/00* (2006.01)
*G06F 17/30* (2006.01)

(52) U.S. Cl. .......................................... 705/26; 705/27

(58) Field of Classification Search ...................... 705/1, 705/10, 26–27
See application file for complete search history.

(56) References Cited

U.S. PATENT DOCUMENTS
2001/0032164 A1* 10/2001 Kim ............................. 705/37

(Continued)

FOREIGN PATENT DOCUMENTS
JP        06-325059        11/1994

(Continued)

OTHER PUBLICATIONS

"Software Arts touts power of pc/MRP purchasing software". Susan Avery. Purchasing, Jan. 13, 2000 [obtained from www.purchasing.com/archive on May 5, 2009].*

(Continued)

*Primary Examiner*—Jeffrey A. Smith
*Assistant Examiner*—William J. Allen
(74) *Attorney, Agent, or Firm*—Morrison & Foerster LLP

(57) ABSTRACT

A user ID and a corporation ID for identifying an organization to which the user belongs are pre-registered in association, and the corporation ID of the organization to which the user belongs is specified based on a login name entered when the user logs in a shopping site by a terminal (S1). Based on the specified corporation ID, a user ID of a user which is associated with the same corporation ID is specified (S2). Based on the specified user ID, order placement information corresponding to the user ID is searched for (S3), and an order placement condition for a predetermined period, of the organization to which the user belongs is displayed on the terminal (S4).

14 Claims, 31 Drawing Sheets

U.S. PATENT DOCUMENTS

| | | | |
|---|---|---|---|
| 2002/0013738 A1* | 1/2002 | Vistisen | 705/26 |
| 2002/0065736 A1* | 5/2002 | Willner et al. | 705/26 |
| 2002/0069135 A1* | 6/2002 | Kondo et al. | 705/26 |
| 2002/0133415 A1* | 9/2002 | Zarovinsky | 705/26 |
| 2002/0156695 A1* | 10/2002 | Edwards | 705/26 |
| 2003/0033205 A1* | 2/2003 | Nowers et al. | 705/26 |
| 2003/0185382 A1* | 10/2003 | Zama | 379/265.13 |

FOREIGN PATENT DOCUMENTS

| | | |
|---|---|---|
| JP | 06-325059 A | 11/1994 |
| JP | 11-232326 | 8/1999 |
| JP | 2000-076340 | 3/2000 |
| JP | 2000-132596 | 5/2000 |
| JP | 2000-137643 | 5/2000 |
| JP | 2000-306007 | 11/2000 |
| JP | 2001-022831 | 1/2001 |
| JP | 2001-118009 | 4/2001 |
| JP | 2001-134648 | 5/2001 |
| JP | 2001-216371 | 8/2001 |
| WO | WO-01/86529 | 11/2001 |

OTHER PUBLICATIONS

Japanese Office Action dated Dec. 26, 2006, directed to counterpart JP application No. 2001-356691.

* cited by examiner

CUSTOMER INFORMATION DB (DB211)

| ID | NAME | ADDRESS | CUSTOMER TYPE | CUSTOMER RANK | SALESPERSON IN CHARGE | RECOMMENDED PRODUCT | MESSAGE FROM SALESPERSON IN CHARGE | DELIVERY PLACE CODE | AREA CODE |
|---|---|---|---|---|---|---|---|---|---|
| 00001 | A | ...TOKYO | CORPORATION (001A) | A | aa | MULTIFUNCTION APPARATUS | ...OFFICE... | K1111 | T01 |
| 01002 | B | ...OSAKA | INDIVIDUAL | | | | | K5432 | T09 |
| ...... | ...... | ...... | ...... | ...... | ...... | ...... | ...... | ...... | ...... |

FIG.3A

CORPORATION INFORMATION (DB211)

| CORPORATION ID | NAME | LOCATION | PERSON IN CHARGE | DIVISION | ... |
|---|---|---|---|---|---|
| 001A | AAA CORP. | ...TOKYO | 0001 | GENERAL AFFAIRS DIVISION | ... |
| | | | 0029 | | |
| | | | 0120 | PURCHASE DIVISION | |
| | | | 0134 | | |
| 001B | BBB CORP. | ...OSAKA | 1000 | GENERAL AFFAIRS DIVISION | ... |
| | | | 9200 | | |
| | | | 0210 | PURCHASE DIVISION | |
| | | | 4310 | | |
| ⋮ | ⋮ | ⋮ | ⋮ | ⋮ | ⋮ |

FIG.3B

SALES INFORMATION (DB212)

| DATE | TRANS-ACTION CODE | PURCHASED PRODUCT | QUANTITY | UNIT PRICE | TOTAL | PURCHASER | SALESPERSON IN CHARGE | ... |
|---|---|---|---|---|---|---|---|---|
| 1/1 | 1 | A123 | 1 | 10,000 YEN | 11,300 | 01001 | AA | ... |
|  |  | C233 | 1 | 1,000 YEN |  |  |  |  |
|  |  | X987 | 3 | 100 YEN |  |  |  |  |
| : | : | : | : | : | : | : | : | : |
| : | : | : | : | : | : | : | : | : |

FIG.3C

BILL INFORMATION (DB213)

| ID:001A AAA CORP. FOR ONE MONTH PERSON IN CHARGE AA ||||||||
|---|---|---|---|---|---|---|---|
| DATE | PRODUCT | QUANTITY | OFFER PRICE | PERSON IN CHARGE | ONLINE? | .... ||
| 1/1 | A123 | 1 | 1,100,000 | MR. A | NO | .... ||
| 1/2 | B321 | 2 | 2,345 | MR. D | YES | .... ||
| : | : | : | : | : | : | : | : |

FIG.3D

PRODUCT INFORMATION (DB231)

| Code | PRODUCT NAME | CATEGORY | REFERENCE PRICE | PRODUCT CLASSIFICATION | LINK INFORMATION |
|---|---|---|---|---|---|
| A123 | NE350 | COPIER | 987,654 | MAIN PART | OPTION B991<br>SUPPLY PRODUCT C203 |
| ⋮ | ⋮ | ⋮ | ⋮ | ⋮ | ⋮ |
| C203 | TN-2000 | TONER | 9,876 | SUPPLY PRODUCT | A123, A246 |
| ⋮ | ⋮ | ⋮ | ⋮ | ⋮ | ⋮ |

FIG.5A

RELATED PRODUCT INFORMATION (DB233)

```
DIGITAL CAMERA X667   =====  PRINTER Y2234                          233A
CD-ROM DRIVE Q741     =====  IMAGE PROCESSING SOFTWARE "PHOTO**"
SCANNER MM2           =====  OCR SOFTWARE "READ**"

⋮
------------------------------------------------------------
DIGITAL CAMERA X667   =====  CABLE P345                             233B
DIGITAL CAMERA X667   =====  IMAGE PROCESSING SOFTWARE "PHOTO**"
DIGITAL CAMERA X667   =====  MEMORY CARD MC256

CUSTOMER INFORMATION (DB232)

| ID | NAME | ADDRESS | CUSTOMER TYPE | CUSTOMER RANK | SALESPERSON IN CHARGE | RECOMMENDED PRODUCT | MESSAGE FROM SALESPERSON IN CHARGE | DELIVERY PLACE CODE | AREA CODE |
|---|---|---|---|---|---|---|---|---|---|
| 00001 | Mr.A | ...TOKYO | CORPORATION (001A) | A | AA | MULTIFUNCTION APPARATUS A123 | ...OFFICE... | K1111 | T01 |
| 01002 | Mr.B | ...OSAKA | INDIVIDUAL | | | | | K5432 | T09 |
| ...... | | | | | | | ...... | | ...... |

FIG.5B

ONLINE USER INFORMATION (DB251)

| ID | NAME | ADDRESS | CUSTOMER TYPE | CUSTOMER RANK |
|---|---|---|---|---|
| 00001 | MR.A | ...TOKYO | CORPORATION (ID:001A) | A |
| 00002 | MR.B | ...OSAKA | INDIVIDUAL | |
| ⋮ | ⋮ | ⋮ | ⋮ | ⋮ |

| SALESPERSON IN CHARGE | LOGIN ACCOUNT | POSSESSED APPARATUS | DELIVERY PLACE CODE | AREA CODE |
|---|---|---|---|---|
| AA | A@+++.COM ******** | A123 C203 | K1111 | T01 |
| | B@$$$.COM ******** | | K5432 | T09 |
| ⋮ | ⋮ | ⋮ | ⋮ | ⋮ |

FIG.7A

CORPORATION INFORMATION (DB251)

| CORPORATION ID | NAME | LOCATION | PERSON IN CHARGE | DIVISION | ... |
|---|---|---|---|---|---|
| 001A | AAA CORP | ...TOKYO | 0001 | GENERAL AFFAIRS DIVISION | ... |
| | | | 0029 | | |
| | | | 0120 | PURCHASE DIVISION | |
| | | | 0134 | | |
| 001B | BBB CORP. | ...OSAKA | 1000 | GENERAL AFFAIRS DIVISON | ... |
| | | | 9200 | | |
| | | | 0210 | PURCHASE DIVISION | |
| | | | 4310 | | |
| ⋮ | ⋮ | ⋮ | ⋮ | ⋮ | ⋮ |

FIG.7B

DELIVERY CENTER INFORMATION (DB271)

| DELIVERY PLACE CODE | DELIVERY CENTER | | | | |
| --- | --- | --- | --- | --- | --- |
| | CENTER A | CENTER B | CENTER C | CENTER D | ...... |
| K1111 INFORMATION (AREA CODE T01) | 1 | | 2 | 3 | ...... |
| K1234 INFORMATION (AREA CODE T02) | 2 | 1 | 4 | 3 | ...... |
| K2123 INFORMATION (AREA CODE T04) | 1 | 2 | 9 | 6 | ...... |
| K3131 INFORMATION (AREA CODE T03) | 3 | 7 | 2 | | ...... |
| ⋮ | ⋮ | ⋮ | ⋮ | ⋮ | ⋮ |

FIG.9A

PRODUCT INFORMATION (DB272)

| PRODUCT CODE | DELIVERY CENTER | | | | |
| --- | --- | --- | --- | --- | --- |
| | CENTER A | CENTER B | CENTER C | CENTER D | ...... |
| A003 | OK | OK | | OK | ...... |
| A321 | OK | | | OK | ...... |
| A234 | OK | OK | | | ...... |
| A172 | | OK | | | ...... |
| ⋮ | ⋮ | ⋮ | ⋮ | ⋮ | ⋮ |

FIG.9B

DELIVERY LEAD TIME INFORMATION (DB273)

| Area Code | DELIVERY CENTER | | | | |
|---|---|---|---|---|---|
| | CENTER A | CENTER B | CENTER C | CENTER D | ...... |
| T01 | ONE DAY | | TWO DAYS | TWO DAYS | ...... |
| T02 | ONE DAY | ONE DAY | THREE DAYS | TWO DAYS | ...... |
| T03 | TWO DAYS | FOUR DAYS | ONE DAY | | ...... |
| T04 | ONE DAY | ONE DAY | FIVE DAYS | THREE DAYS | ...... |
| ⋮ | ⋮ | ⋮ | ⋮ | ⋮ | ⋮ |

FIG.9C

SHIPMENT RECEPTION CONDITION INFORMATION (DB274)

| PRODUCT CODE | STOCK CONDITION | NUMBER IN STOCK | NEXT SHIPMENT RECEPTION PLAN | PLANNED SHIPMENT RECEPTION DATE | PLANNED AMOUNT OF SHIPMENT |
|---|---|---|---|---|---|
| A003 | IN STOCK | 100 | UNPLANNED | ----- | ----- |
| A321 | IN STOCK | 1 | UNPLANNED | ----- | ----- |
| A234 | OUT OF STOCK | ----- | PLANNED | JAN.25 | 20 |
| A172 | OUT OF STOCK | ----- | UNPLANNED | ----- | ----- |
| ⋮ | ⋮ | ⋮ | ⋮ | ⋮ | ⋮ |

FIG.9D

| TOP PAGE | | |
|---|---|---|
| NEW REGISTRATION | LOGIN NAME (E-MAIL ADDRESS) [  ] PASSWORD [  ] GO | |

REGISTRATION (FREE!) IS NECESSARY TO ENJOY THIS SERVICE.

LET'S TRY!

NOTICE                                                                    LIST

................................................................
................................................................
              .............................

CLICK HERE IF YOU WANT TO TRY THIS SERVICE

---

LINK TO PERTINENT INFORMATION     SERVICE INFORMATION

- FREE TRIAL OF BUSINESS SOFTWARE
- CONSTRUCTION CALS

| PERSONAL PAGE FOR MR.A | | |
|---|---|---|
| ONLINE SHOPPING<br>[ QUICK ORDER FOR EXPENDABLE SUPPLY ]<br>[ LIST OF PRODUCTS HANDLED ]<br>• CONTENT OF CART<br>• ORDER CONDITION<br><br>APPLICATION SERVICE<br>[ SERVICE LIST SUBSCRIPTION ]<br>▶ UTILITY<br>▶ CONVENIENT TOOL<br><br>INFORMATION SERVICE<br>[ INFORMATION SERVICE LIST ]<br>▶ NEWS ARTICLES<br>▶ TODAY'S WEATHER<br>▶ HELPFUL INFORMATION | Dear MR.A<br>NOW IS THE TIME FOR RENEWING THE ANALOG COPIER IN YOUR OFFICE. WHAT ABOUT A DIGITAL MULTIFUNCTION COPIER ALO USABLE AS A LASER PRINTER? | <br>SALES PERSON IN CHARGE<br>AA<br>TOKYO SERVICE CENTER<br>TEL:03-0000-0000<br>E-MAIL:0000@MAIL.CO.JP |
| | RECOMMENDED PRODUCTS ( LIST ) | |
| | 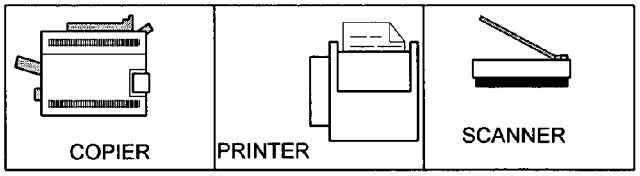<br>COPIER    PRINTER    SCANNER | |
| | NOTICE<br>We WILL GIVE YOU A POINT THAT MAY WIN YOU A LUXURY PRIZE, IF YOU BUY ANY PRODUCT OR ANSWER A QUISTIONAIRE.<br>CLICK HERE FOR DETAILS | SERVICE INFORMATION<br>THIS IS A SERVICE FOR PROVIDING LATEST FORMATS FOR LEGAL MATTERS VIA THE INTERNET.<br><br>FOR DETAIL INFORMATION ▼ |

FIG.13

PURCHASE LOG

CUSTOMER: MR.A
DIVISION: AAA CORP. GENERAL AFFAIRS DIVISION

ORDERS IN THE PAST ONE MONTH OF AAA CORP. GENERAL AFFAIRS DIVISION ARE DISPLAYED. IF YOU WANT TO CHECK OTHER ORDERS, USE THE SEARCH FUNCTION

| ORDER NUMBER | DATE | PRODUCT NAME | ORDER PLACER | TOTAL PRICE | COMMENT |
|---|---|---|---|---|---|
| NET938123 | 010219 | DIGITAL CAMERA | MR.A | 54,000 YEN | DETAILS |
| NET738920 | 010305 | TONER CARTRIDGE | MR.C | 24,000 YEN | DETAILS |
| NET830203 | 010310 | COLOR PRINTER | MR.D | 298,000 YEN | DETAILS |
| NET374892 | 010312 | WORD PROCESSING SOFTWARE | MR.A | 28,000 YEN | DETAILS |
| NET374920 | 010315 | COPYING SHEET | MR.E | 6,500 YEN | DETAILS |

( DOWNLOAD )

■ SEARCH

ORDER NUMBER: NET [          ]

ORDER PLACER: [ MR.A ▼ ]

DATE OF ORDER: [          ] ~ [          ]

( SEARCH )  ( RESET )

TO PRODUCT PURCHASE PAGE >>

FIG.17

ORDER CONDITION

CONTENT OF ORDER

ORDER NUMBER: NET738920
ORDER PLACER: MR.E
DATE OF ORDER: SEPTEMBER 19,2001
SPECIFICATION NUMBER: 12345
PRODUCT NAME: TNC001 TONER CARTRIDGE
QUANTITY: 1
UNIT PRICE: 24,000 YEN
TOTAL PRICE: 24,000 YEN
CONDITION: IN SHIPPING PROCESS

CLICK HERE FOR CANCELING THE ABOVE ORDER

DELIVERY PLACE

DELIVEREE'S NAME: AAA CORP. GENERAL AFFAIRS DIVISION
POSTAL CODE NUMBER: *-**
ADDRESS: ...TOKYO
PHONE NUMBER: 03-**-**
RECEIVER: MR.E
DELIVERY REQUEST DATE: OCTOBER 19,2001

BILL SENDEE

AAA CORP. GENERAL AFFAIRS DIVISION

BILL COLLECTOR

$$$ CORP. TOKYO SEVICE CENTER
YOUR BILL WILL BE COLLECTED AT THE PRODUCT SELLING
WINDOW YOU USUALLY USE.
ASK SALESPERSON IN CHARGE FOR DETAILS.

TO PRODUCT PURCHASE
PAGE>>

| MAKER'S DESIRED RETAIL PRICE | 26,900 YEN | OFFER PRICE | 19,800 YEN |

WORLD SLIMMEST DIGITAL CAMERA WITH 3 MEGA PIXEL CCD
AND OPTICAL THREE-TIME MAGNIFYING ZOOM

FEW IN STOCK   (DETAILS)   (OPTION)   (SUPPLY PRODUCT)   (PUT IN CART)

PF-11[881300]

| MAKER'S DESIRED RETAIL PRICE | 18,900 YEN | OFFER PRICE | 13,300 YEN |

COMPACT AND STYLISH-THIS IS A HIT CAMERA.
WAITING FOR SHIPMENT RECEPTION(NEXT
SHIPMENT RECEPTION:PLANNED ON JAN. 25)

(DETAILS)   (OPTION)   (SUPPLY PRODUCT)   (TO SALESPERSON IN CHARGE)

FF-31[770150]

| MAKER'S DESIRED RETAIL PRICE | 154,900 YEN | OFFER PRICE | 121,000 YEN |

DIGITAL CAMERA FOR PROFESSIONALS
(HIGH RESOLUTION/HIGH DURABILITY)

WAITING FOR SHIPMENT RECEPTION (NEXT
SHIPMENT RECEPTION : UNPLANNED)

(DETAILS)   (OPTION)   (SUPPLY PRODUCT)   (TO SALESPERSON IN CHARGE)

20-30 PRODUCTS OUT OF 52 ARE NOW DISPLAYED

<BACK 1 2 3 4 5 6 NEXT>

▶ SEARCH      ❓ HELP

[                              ]  [SEARCH]

FIG.23

CONTENTS OF CART

CONTENTS OF CART

CURRENT POINT: 25000 POINT

PRODUCTS CURRENTLY PUT IN CART

| PRODUCT NAME | PRODUCT CODE | QUANTITY | CONDITION | POINT | UNIT PRICE | TOTAL | |
|---|---|---|---|---|---|---|---|
| PRINTER P330 | 100049 | 3 | FEW IN STOCK | 10000 | 200,000 YEN | 600,000 YEN | CANCEL |
| SCANNERS K50 | 100070 | 2 | WAITING FOR SHIPMENT | 10000 | 100,000 YEN | 200,000 YEN | CANCEL |
| CD-R/RW R50 | 100074 | 1 | WAITING FOR SHIPMENT RECEPTION (UNPLANNED) | 10000 | 100,000 YEN | 100,000 YEN | CANCEL |
| | | | | | TOTAL | 900,000 YEN | RECAL-CULATE |

WE SEPARATELY CHARGE CONSUMPTION TAX AND POSTAGE

[CHECK OTHER PRODUCT]   [TO ORDER PROCEDURE]

FIG.25

DELIVERYPLACE INPUT/REGISTRATION

DELIVERY PLACE

| | |
|---|---|
| DELIVEREE(CORPORATION NAME): | AAA CORPORATION |
| DELIVEREE (DIVISION NAME/RECEIVER'S NAME): | GENERAL AFFAIRS DIVISION, MR.A |
| POSTAL CODE NUMBER: | 999 — 9999 |
| PREFECTURE/CITY: | ...TOKYO |
| TOWN NAME/STREET NUMBER: | * — * — * |
| BUILDING NAME: | ??BUILDING |
| PHONE NUMBER: | 000-111-2222 |
| FAX NUMBER: | 000-111-3333 |

☑ IF YOU WANT TO DESIGNATE A DESIRED DELIVERY DATE, PLEASE MARK THE CHECK BOX AND DESIGNATE THE DESIRED DATE. IF YOU DON'T DESIGNATE A DELIVERY DATE, PRODUCTS WILL BE DELIVERED IN THE SHORTEST DELIVERY LEAD TIME.
※ PLEASE UNDERSTAND THE PRODUCTS CANNOT BE DELIVERED ON YOUR DESIRED DELIVERY DATE IN SOME CASE.

PAYMENT METHOD DESIGNATION

● PAY BY BANK TRANSFER   ○ C.O.D.   ○ ON CREDIT

CARD TYPE:  --PLEASE SELECT-- ▼
CARD NUMBER: 
GOOD THRU:  [  ] YEAR [  ] MONTH

[ NEXT ]

FIG.26

ORDER PROCEDURE IS COMPLETED.

ORDER RECEPTION PROCESS IS COMPLETED.
SORRY THAT THE FOLLOWING PRODUCTS CANNOT BE DELIVEREDE ON THE DESIGNATED DELIVERY DATE.
AAA-111AA
BAB-121BB

SEE "CONDITION" SECTION IN THE BELOW "CONTENTS OF ORDER", AS TO THE DATE DELIVERABLE.

ORDER NUMBER: 00000050000
DATE AND TIME OF ORDER: 2001/09/09 21:21:21

※ CLICK HERE TO CHANGE OR CANCEL CONTENTS OF ORDER.

PURCHASER
| | |
|---|---|
| CORPORATION NAME/OFFICE NAME: | AAA CORPORATION |
| DIVISION NAME: | GENERAL AFFAIRS DIVISION |
| ADDRESS: | 999-9999 |
| | ...TOKYO |
| PHONE NUMBER: | 03-3333-XXXX |
| FAX NUMBER: | 03-3333-**** |
| E-MAIL ADDRESS: | A@AAA.##.JP |

CONTENTS OF ORDER

| ORDER NUMBER/ SPECIFICATION NUMBER | PRODUCT NAME | QUANTITY | UNIT PRICE | TOTAL | CONDITION |
|---|---|---|---|---|---|
| 12345678/ 08851 | MF2HDMC FW10P | 1 | 4,200 YEN | 4,200 YEN | PLANNED TO DELIVER ON JAN.31,2003 |
| 12345678/ 08851 | AAA-111AA | 1 | 5,200 YEN | 5,200 YEN | PLANNED TO DELIVER ON FEB.5,2003 |
| 12345678/ 08851 | BAB-121BB | 1 | 6,400 YEN | 6,400 YEN | PLANNED TO DELIVER ON JAN.10,2003 |

SUB TOTAL 15,800 YEN
POSTAGE 0 YEN
CONSUMPTION TAX 790 YEN
TOTAL 16,590 YEN

FIG.27

SYSTEMS, METHODS, AND COMPUTER READABLE MEDIUM FOR PROVIDING A SITE FOR SELLING A PRODUCT IN RESPONSE TO A REQUEST FROM A TERMINAL

TECHNICAL FIELD

The present invention relates to a business transaction utilizing a network, and particularly relates to a network system or the like suitable for efficient utilization of online shopping by a group.

BACKGROUND ART

With the growth of the internet, online shopping is becoming rapidly widespread.

Ordinary online shopping is conducted in a way that a user becomes the user of a system in advance, logs in a web page selling products, etc. by using a predetermined terminal after the user registration, selects a product in the web page, and inputs payment settlement information.

In such online shopping utilizing the internet, there is known a technique for storing purchase log information regarding products bought by a user in the past and information regarding the user in association, and enabling the user to utilize the purchase log information when the user accesses a shopping site (for example, see Unexamined Japanese Patent Application KOKAI Publication No. 11-232326, Unexamined Japanese Patent Application KOKAI Publication No. 2000-306007, Unexamined Japanese Patent Application KOKAI Publication No. 2001-22831, and Unexamined Japanese Patent Application KOKAI Publication No. 2001-134648).

On the other hand, a business organization such as a corporation, etc. has many group members group by group (for example, section, division, etc.), and generally one group member purchases an article for the use in the group to which the member belongs. Here, in a case where a plurality of group members in the same group order the same article, the order is duplicate and the purchased article might be wasteful.

The above-described prior art is for enabling an individual to utilize the purchase log of his/her own, and no consideration is given to application of this art to purchase of articles group by group in a corporation, etc. and management of the articles. That is, the above-described prior art has a drawback that purchase log of each group member can be utilized but this does not facilitate efficient utilization of online shopping by the group.

DISCLOSURE OF INVENTION

The present invention was made in view of the above circumstance, and an object of the present invention is to provide a network system suitable for efficient utilization of online shopping by a group in a corporation, etc.

A network system according to a first aspect of the present invention is a network system for providing a site for selling a product based on information entered by a terminal connected to a network, and comprises an order placement information storage unit which stores order placement information representing a content of an order placed from the terminal in association with operator information for identifying an operator of the terminal, an identification information storage unit which stores organization information for identifying an organization to which the operator belongs in association with operator information regarding an operator who belongs to the organization, an identification information specifying unit which specifies the organization information corresponding to the operator information of the operator of the terminal which has been permitted to log in the site, and operator information regarding an operator associated with the organization information, by referring to the identification information storage unit, an order placement information acquiring unit which acquires order placement information associated with the operator information specified by the identification information specifying unit, by searching the order placement information storage unit, and an order placement information notifying unit which notifies the order placement information acquired by the order placement information acquiring unit to the terminal which has been permitted to log in.

In the above-described network system, the identification information specifying unit may comprise an organization information specifying unit which specifies the organization information corresponding to the operator information of the operator of the terminal which has been permitted to log in the site, by referring to the identification information storage unit, and an operator information specifying unit which specifies operator information corresponding to the organization information specified by the organization information specifying unit, by referring to the identification information storage unit, and the order placement information acquiring unit may acquire order placement information associated with the operator information specified by the operator information specifying unit.

The above-described network system may further comprise an operator selection means providing unit which provides the terminal with selection means for selecting at least one operator among operators corresponding to operator information specified by the operator information specifying unit, and the order placement information acquiring unit may search the order placement information storage unit to acquire order placement information associated with operator information of the operator selected by the selection means from the terminal.

In the above-described network system, it is preferred that the order placement information acquiring unit acquire order placement information regarding a predetermined period.

In the above-described network system, the order placement information may include at least article information for identifying an ordered article, quantity information indicating an ordered quantity, price information indicating a price of the ordered article, order placement date information indicating an order placement date, and deliveree information indicating a deliveree of the ordered article.

The above-describe network system may further comprise search condition providing means for providing the terminal with condition selection means for selecting a search condition for order placement information associated with operator information specified by the operator information specifying unit, and the order placement information notifying unit may present on the terminal, order placement information stored in the order placement information storage unit and searched out by the order placement information acquiring unit based on the search condition selected by the condition selection means from the terminal.

In the above-described network system, it is preferred that the condition selection means can select at least one of the article information, the order placement date information, and the deliveree information.

According to this structure, when an organization member of an organization such as a corporation places an order for a product by utilizing the present network system, the organization member can refer to a content of an order placed by another organization member belonging to the same organization unit (for example, work unit, division, section, group, etc.) as the organization member. In this case, by order placement information for the organization unit covering, for example, one month before the present date and time being automatically displayed, the organization member can easily refer to the present order placement condition.

Therefore, the organization member can know whether or not the product which the member is about to order has been already ordered by another organization member, making it possible to prevent a duplicate order and perform the order placing process efficiently.

Further, by entering a search condition such as order placement date information, deliveree information, etc., the organization member can refer to an order placement condition corresponding to the search condition. This makes it possible for, for example, a manager to easily refer to an order placement (purchase) condition for the organization unit and to utilize it in the management of accounting information.

A method of providing online shopping according to a second aspect of the present invention stores user information for identifying a user in association with organization information for identifying an organization to which the user belongs, stores order placement information indicating a content of an order placed from a terminal connected to a network in association with user information of an order placer, specifies, when the user accesses a shopping site via the network, corresponding organization information based on the user information entered from the terminal, and specifies user information of an order placer associated with the organization information, and acquires order placement information associated with the specified user information from the stored order placement information, and notifies the acquired order placement information to the terminal as information indicating a purchase log of an organization corresponding to the specified organization information.

A purchase log presenting method according to a third aspect of the present invention is a purchase log presenting method which is applied to a network system for providing a product selling service based on information entered from a terminal connected to a network, and comprises a user registering step of performing user registration by registering user information for identifying a user of the service, an organization information registering step of registering, in a case where the user registered in the user registering step uses the service as a member of an organization, organization information for identifying the organization in association with the user information, an order placement information storing step of storing order placement information indicating a content of an order placed when the service is used, in association with user information of an order placer, an organization information specifying step of specifying, when the user uses the service, corresponding organization information based on the user information, a user information specifying step of specifying, in a case where organization information is specified in the organization information specifying step, user information associated with the organization information, and an order placement information notifying step of acquiring order placement information associated with the user information specified in the user information specifying step from the order placement information stored in the order placement information storing step, and notifying the acquired order placement information to the terminal as information indicating a purchase log.

A server apparatus according to a fourth aspect of the present invention is a server apparatus which is connected to a network, provides a site for selling a product in response to a request from a terminal connected to the network, and comprises a connection unit which connects to the network, an identification information storage unit which stores operator information for identifying an operator of the terminal in association with organization information for identifying an organization to which the operator belongs, an order placement information storage unit which stores a content of an order placed from the terminal in association with operator information of an operator who has placed the order, an order placement reception unit which receives a placed order for a product and receives operator information indicating an operator of a terminal which has sent the order, by controlling the connection unit, an organization information acquiring unit which acquires from the identification information storage unit, organization information associated with the operator information based on the operator information received by the order placement reception unit, an operator information acquiring unit which acquires from the identification information storage unit, operator information associated with the organization information based on the organization information acquired by the organization information acquiring unit, an order placement information acquiring unit which acquires from the order placement information storage unit, order placement information associated with the operator information based on the operator information acquired by the operator information acquiring unit, and an order placement information sending unit which sends the order placement information acquired by the order placement information acquiring unit to the terminal of the operator as purchase log information, by controlling the connection unit.

In the above-described server apparatus, it is preferred that the order placement information sending unit present a selection area for selecting at least one operator among operators corresponding to operator information acquired by the operator information acquiring unit, on the terminal, and the order placement information acquiring unit acquire from the order placement information storage unit, order placement information associated with operator information of the operator selected in the selection area.

In the above-described server apparatus, the order placement information sending unit may present an input area for inputting a search condition for order placement information associated with operator information acquired by the operator information acquiring unit, on the terminal, and may present a result of search for the order placement information stored in the order placement information storage unit which is searched by the order placement information acquiring unit based on the search condition input in the input area, on the terminal.

In the above-described server apparatus, it is preferred that the order placement information include at least article information for identifying an ordered article, order placement date information indicating an order placement date, and deliveree information indicating a deliveree of the ordered article, and the order placement information acquiring unit search the order placement information storage unit using at least one of the article information, the order placement date information, and the deliveree information as the search condition.

All parts or some parts of a program necessary for a computer to function as the above-described server apparatus may be recorded on a recording medium (a ROM, a flexible disk, a hard disk a CD-ROM, an MO, a CD-R, a flash memory) or the like to be distributed and circulated.

Further, all parts or some parts of a signal necessary for controlling a computer as the above-described server apparatus may be provided by a carrier wave.

BRIEF DESCRIPTION OF DRAWINGS

FIG. 3A is a diagram showing an example of customer information stored in the in-store DB system;

FIG. 3B is a diagram showing an example of corporation information stored in the in-store DB system;

FIG. 3C is a diagram showing an example of sales information stored in the in-store DB system;

FIG. 3D is diagram showing an example of bill information stored in the in-store DB system;

FIG. 5A is a diagram showing an example of product information stored n the master DB system;

FIG. 5B is a diagram showing an example of customer information stored in the master DB system;

FIG. 5C is a diagram showing an example of related product information stored in the master DB system;

FIG. 7A is a diagram showing online user information stored in the shopping DB system;

FIG. 7B is a diagram showing corporation information stored in the shopping DB system;

FIG. 9A is a diagram showing delivery center information stored in the shipping management DB;

FIG. 9B is a diagram showing product information stored in the shipping management DB;

FIG. 9C is a diagram showing delivery lead time information stored in the shipping management DB;

FIG. 9D is a diagram showing shipment reception condition information stored in the shipping management DB;

FIG. 12 is a diagram showing a display example of a top page displayed in the web page providing process shown in FIG. 11;

FIG. 13 is a diagram showing a display example of a personalized page displayed in the web page providing process shown in FIG. 11;

FIG. 17 is a diagram showing a display example of a purchase log page displayed in the purchase log displaying process shown in FIG. 16;

FIG. 18 is a diagram showing a display example of an order condition page displayed in the purchase log displaying process shown in FIG. 16;

FIG. 23 is a diagram showing a display example of a shopping page displayed in the shopping page displaying process shown in FIG. 22;

FIG. 25 is a diagram showing a display example of a cart confirming screen displayed in an order receiving process shown in FIG. 24;

FIG. 26 is a diagram showing a display example of an order confirming screen displayed in an order confirming/order placing process shown in FIG. 24; and FIG. 27 is a diagram showing a display example of an order completion page displayed in an order reception notifying process shown in FIG. 24.

BEST MODE FOR CARRYING OUT THE INVENTION

Figure 1:
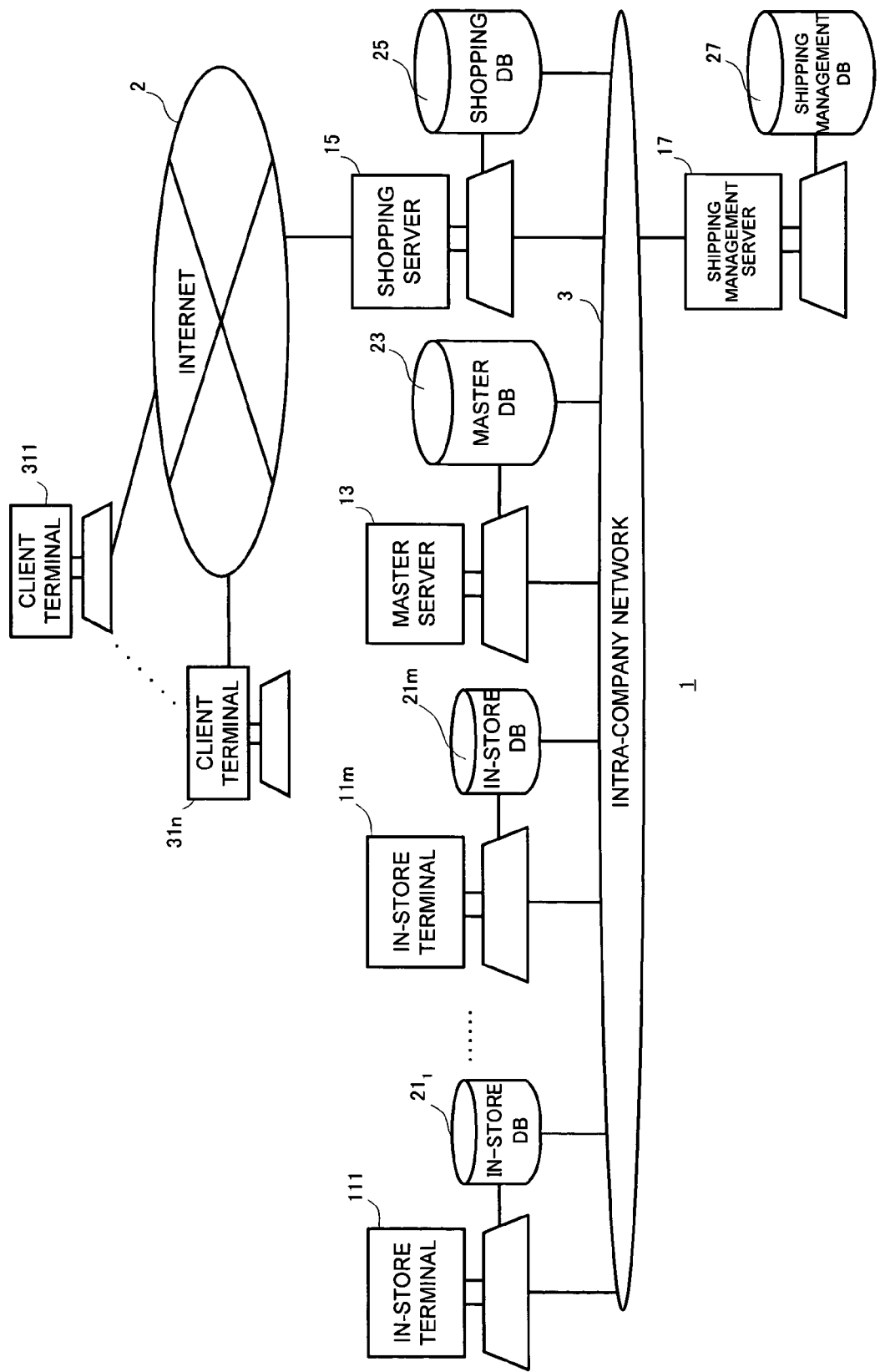
FIG. 1 is a diagram showing a structure of a network system according to an embodiment of the present invention.

FIG. 1 exemplarily shows a structure of a network system according to a first embodiment of the present invention. As shown in FIG. 1, this system comprises an intra-company network system 1 held by a business organization such as a company, an association, etc., internet 2 open to the public, and client terminals 31 ($31_1$ to $31_n$) connected to the internet 2.

The intra-company network system 1 is constituted by an intranet or the like, and comprises a plurality of in-store terminals 11 ($11_1$ to $11_m$) and in-store DB systems 21 ($21_1$ to $21_m$), a master server 13, a master DB system 23, a shopping server 15, a shopping DB system 25, a shipping management server 17, and a shipping management DB 27 system, all of which are connected to each other via an intra-company network 3 such as a LAN, a WAN, and the like.

Figure 2:
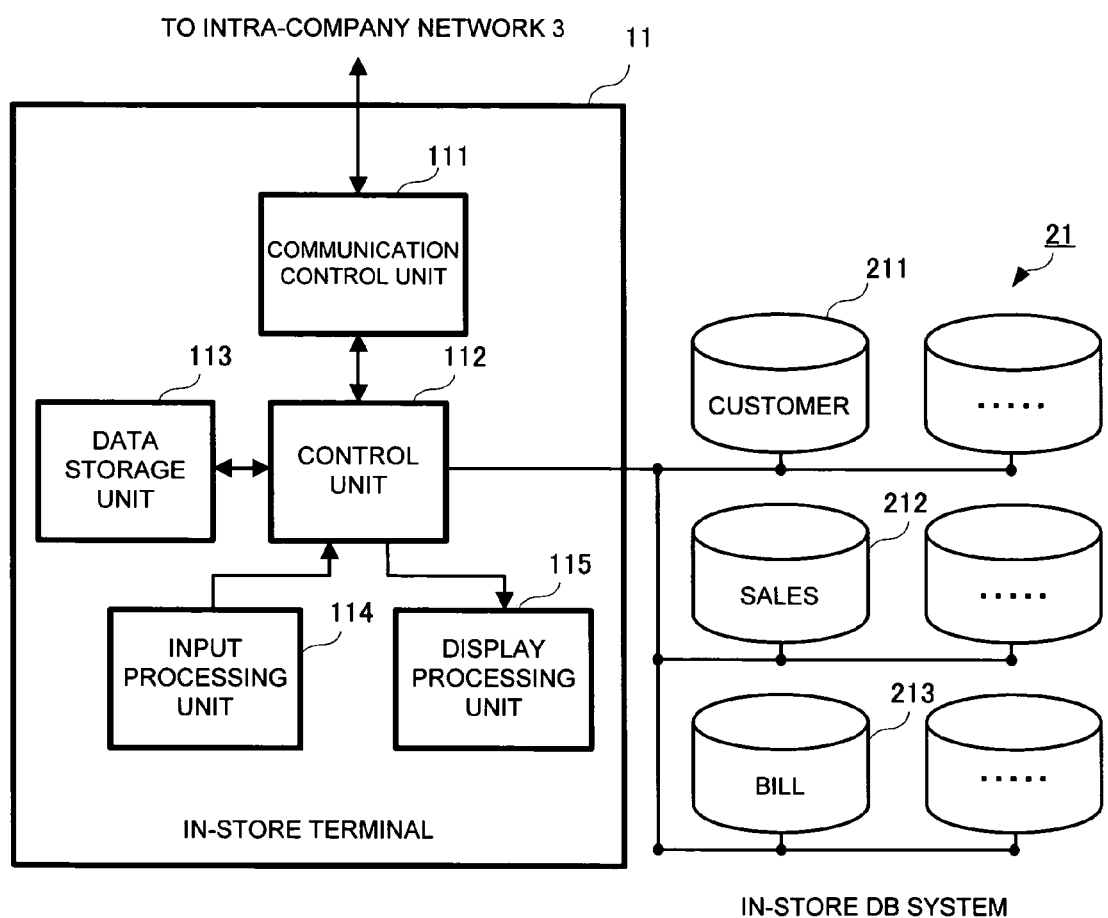
FIG. 2 is a diagram showing structures of an in-store terminal and an in-store DB system installed in each store.

The in-store terminal 11 is a terminal installed in the business organization's own or franchised stores, service shops, etc. for processing business affairs in the respective stores. Each in-store DB system 21 is a DB system for each store to process each store's own business affairs. The in-store terminal 11 and the in-store DB system 21 have configurations shown in FIG. 2. As shown in FIG. 2, the in-store terminal 11 comprises a communication control unit 111, a control unit 112, a data storage unit 113, an input processing unit 114, and a display processing unit 115.

The communication control unit 111 is for sending and receiving various information via the intra-company network 3 under the control of the control unit 112.

The control unit 112 performs communications via the communication control unit 111, or processes various information concerning business affairs in a store in accordance with an instruction input from the input processing unit 114. Further, the control unit 112 creates image information and supplies it to the display processing unit 115.

The data storage unit 113 is constituted by a semiconductor memory, a magnetic disk recording device, or the like, and stores various information and programs.

The input processing unit 114 is constituted by a keyboard, a pointing device, and the like, and is for inputting instructions and data.

The display processing unit 115 is constituted by a display device, a video memory, and the like, and displays images in accordance with image information supplied form the control unit 112 for presenting (outputting) information, etc.

On the other hand, the in-store DB system 21 comprises a customer DB 211, a sales DB 212, and a bill DB 213.

As shown in FIG. 3A, the customer DB 211 is a DB in which basic information regarding a customer of a store's own is set, and stores information such as customer ID, name, address, customer type (distinction between corporation and individual (corporation ID in case of a corporation)), customer rank, salesperson in charge, recommended product, message from salesperson in charge, delivery place code, area code, etc. Here, "customer ID" is information for identifying a customer, and information unique to each customer is set therefor. "Customer rank" indicates the degree of excellence of a customer concerned. Discount rates for product prices and coupons to be given to the customer concerned are determined in accordance with "customer rank". "Customer rank" is set by, for example, a salesperson in charge. "Recommended product" is a product a salesperson in charge wants to recommend to his/her customer, and is set by the salesperson in charge. Further, "message from salesperson in charge" is a short message from a salesperson in charge of each customer. "Delivery place code" and "area code" are codes for identifying the delivery place for a product, and are codes set in advance correspondingly to the address or the like of the delivery place.

Further, as shown in FIG. 3B, the customer information DB 211 also stores information regarding a corporate customer. As shown in FIG. 3B, record is generated for each corporation ID assigned corporation by corporation. Each record stores information representing name of the corporation concerned, location, customer ID of a person in charge of purchase, and his/her belonging division.

The sales DB 212 stores product code, quantity, and unit price of a purchased product, purchaser (ID), salesperson in charge (ID), etc. in unit of each business transaction, as shown in FIG. 3C. Since sales information is stored in unit of each business transaction, products (product group) purchased at the same time can be known.

The bill DB 213 is a DB for cumulating bill information for one month and issuing a bill, and information such as date of selling, purchased product, quantity, unit price (offer price), person in charge (in case of a corporation), etc. are set therein customer by customer as shown in FIG. 3D. In this shopping system, also in a case where a corporation purchases a product through online shopping using the internet, the store in charge of this corporation issues a collective bill. Therefore, similar information is set in the bill DB 213 for the sales through online shopping, and information representing whether it is a sales through online shopping or not ("on-line?": YES/NO) is further set.

The master server 13 and the master DB system 23 shown in FIG. 1 are computer systems for processing jobs of the business organization on the whole.

Figure 4:
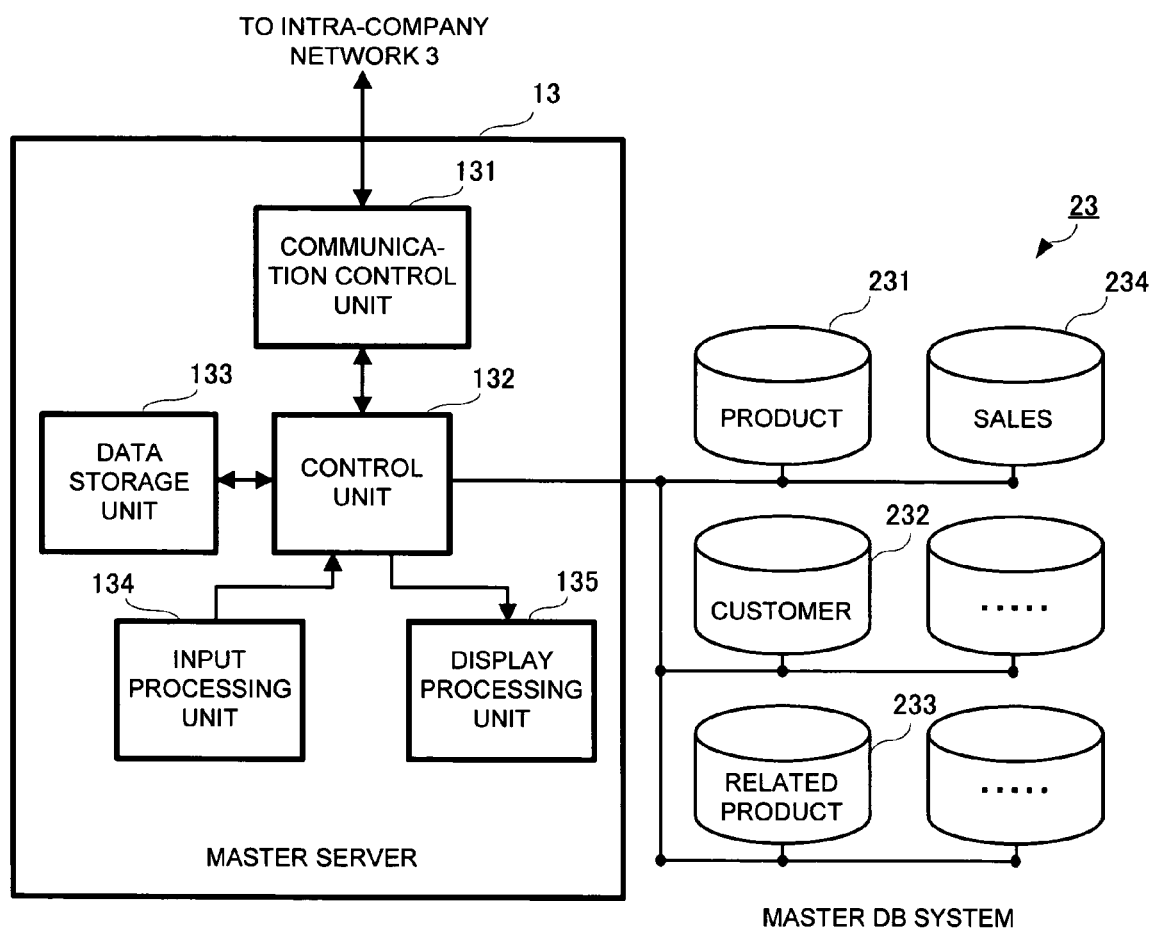
FIG. 4 is a diagram showing structures of a master server and a master DB system.

As shown in FIG. 4, the master server 13 comprises a communication control unit 131, a control unit 132, a data storage unit 133, an input processing unit 134, and a display processing unit 135. The structures and functions of the communication control unit 131, control unit 132, data storage unit 133, input processing unit 134, and display processing unit 135 are basically the same as the structures and functions of the communication control unit 111, control unit 112, data storage unit 113, input processing unit 114, display processing unit 115 of the in-store terminal 11. However, note that the functions of the control unit 132 include functions necessary for processing management works of the business organization on the whole.

On the other hand, the master DB system 23 is for totaling and managing various data of the business organization on the whole, and comprises a product DB 231, a customer DB 232, a related product DB 233, and a sales DB 234 as shown in FIG. 4.

The product DB 231 stores product code of every product dealt in by this business organization, product name, product classification, reference unit price, product category, link information, etc., as shown in FIG. 5A.

Here, product category is information indicating which of "main part", "option", and "supply product" a product concerned belongs to. "Main part" points to a principal product which is usually used solely. "Option" points to a product which is usually not used solely, but used attached to or connected to "main part". "Supply product" points to one that is usually not used solely, but set in "main part" or "option" and reduced along with its use. Taking for example, a copier as an example, the copier itself corresponds to "main part", a feeder, a sorter, a communication device, a power source device, etc. which are used while installed in the copier correspond to "option", and toner and sheet of paper correspond to "supply product". Further, taking a digital camera as an example, the camera itself corresponds to "main part", a cable for connecting the camera and a personal computer, communication software, etc. correspond to "option", and a flash memory card for cumulating images, a battery, etc. correspond to "supply product".

Link information is information for registering anything that is in a different product category and can be applied to a product concerned. For example, in case of "main part", product codes of options and supply products that are matched to the main part are registered. Likewise, in case of "option", product codes of main parts to which the option is matched, or product codes of supply products matched to the option are registered. Further, in case of "supply product", product codes of main parts and options to which the supply product is matched are registered. In the example shown in FIG. 5A, C203 is listed as a supply product that can be applied to a product categorized as main part and identified by a product code A123. Accordingly, link information for the product code C203 has listed A123 as a main part to which it is matched.

Due to the product category and link information, each product is classified into any of the product categories and matching products are linked with. Accordingly, if a model type of, for example, a main part is designated, options or supply products matched to the designated main part can be specified. Products can be selected or designated by this type of association method. Further, a product category is first specified, and products that are suited to an arbitrary product can be selected and designated from the specified product category.

The customer DB 232 stores customer information regarding all customers of this business organization. The stored contents are, as shown in FIG. 5B, almost the same as those in the customer DB 211 shown in FIG. 3A. However, note that the customer DB 232 also stores information on a product (apparatus) possessed by each customer. Further, the customer DB 232 also stores corporation information shown in FIG. 3B, likewise the customer DB 211 of the in-store DB system 21.

The related product DB 233 records a product, etc. that has a high possibility of being purchased together with something or should preferably be purchased together with something, as shown in FIG. 5C.

For example, it can be considered that an arbitrary product and its options and supply products are related with each other. Further, in a case where, for example, a digital camera is purchased, software for editing and processing taken images and a printer for printing the processed images should preferably be purchased. Accordingly, these products are related products. As in this case, if such relation is obvious beforehand, relation information indicating the related products is set in an area 233A of the related product DB 233 by a person in charge via the input processing unit 134.

On the other hand, even in a case where the person in charge of this system does not notice such relation, products that are bought by many people together with an arbitrary product are in many cases ones that should preferably be purchased together. Hence, the control unit 132 checks past sales logs, and registers relation information indicating relation between two products if a ratio of the two products being purchased together exceeds a predetermined value, for example, 5%.

The sales DB 234 has set information regarding sales of this business organization on the whole, which is the accumulation of sales data in all the stores. The structure is basically the same as the structure of the sales DB 212 of each store shown in FIG. 3C, and sales information in unit of each business transaction is registered. Accordingly, the master server 13 can find out products that were purchased together with something based on the contents of the sales DB 234.

Figure 6:
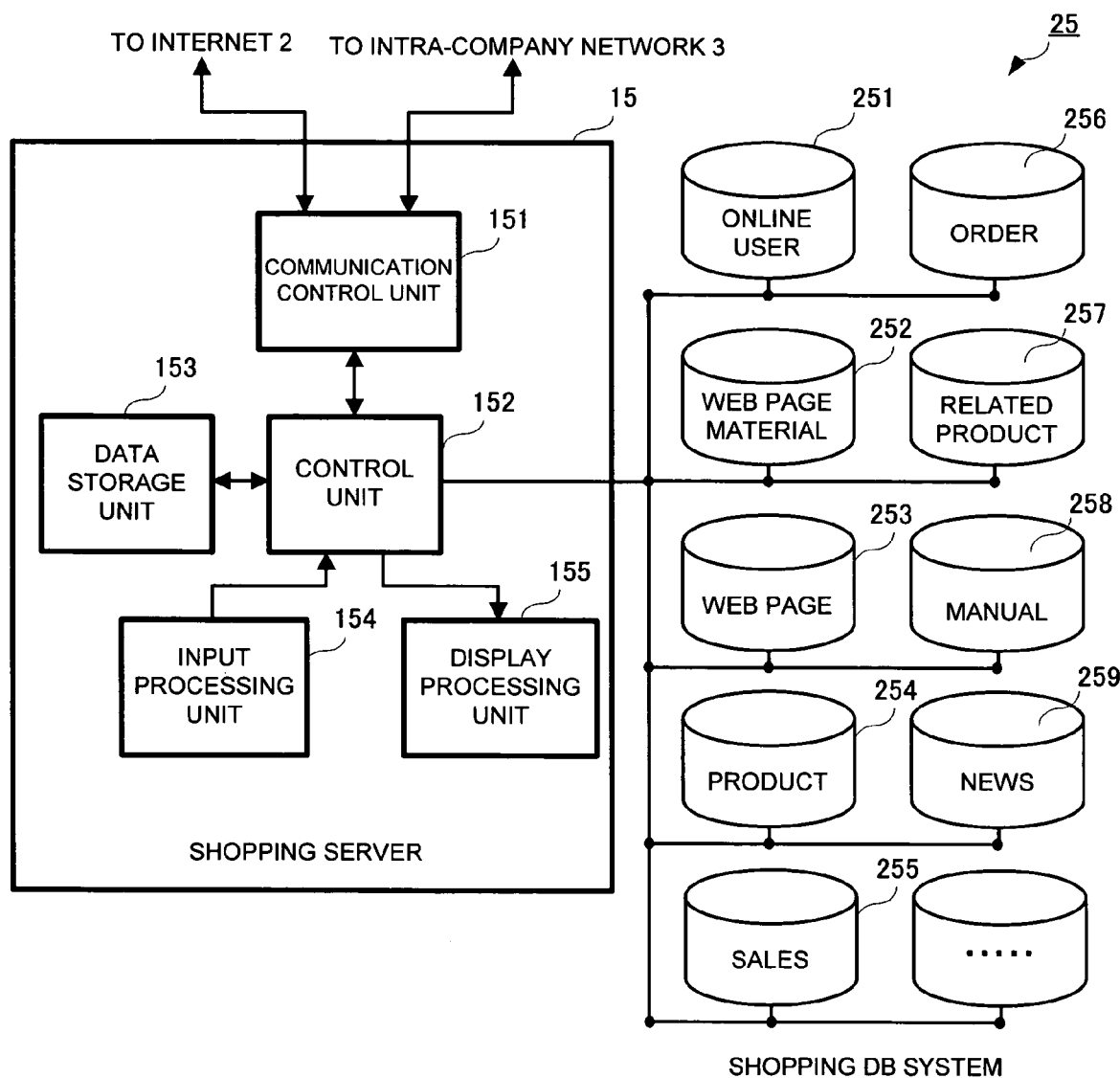
FIG. 6 is a diagram showing structures of a shopping server and a shopping DB system.

The shopping server 15 and the shopping DB system 25 shown in FIG. 1 are systems for processing online shopping via the internet, and have structures shown in FIG. 6.

As shown in FIG. 6, the shopping server 15 comprises a communication control unit 151, a control unit 152, a data storage unit 153, an input processing unit 154, and a display processing unit 155.

The structures and functions of the communication control unit 151, control unit 152, data storage unit 153, input processing unit 154, and display processing unit 155 are basically the same as the structures and functions of the communication control unit 111, control unit 112, data storage unit 113, input processing unit 114, and display control unit 115 of the in-store terminal 11. However, the function of the control unit 152 includes a function necessary for operating a web page for online shopping, processing of sales volume, etc.

As shown in FIG. 6, the shopping DB system 25 comprises an online user DB 251, a web page material DB 252, a web page DB 253, a product DB 254, a sales DB 255, an order DB 256, a related product DB 257, a manual DB 258, and a news DB 259.

The online user DB 251 is a database for storing information regarding a user of online shopping, and customer ID, name, address, customer type (distinction between corporation and individual (corporation ID is additionally recorded in case of a corporation)), login account (email address/password), possessed apparatus, delivery place code, and area code are set therein, as shown in FIG. 7A. Further, in case of a corporation, customer rank, salesperson in charge (store+ salesperson in charge), recommended product, message from salesperson in charge, etc. are set. Customer ID is information for identifying a user. In case of a corporate customer, ID same as the ID used at a store or service store is used as the customer ID. Name and address are the name and address/location of a user concerned. Login account is a pair of address for electronic mail (email address) of a user concerned and password, and is necessary when the user concerned logs in an online shopping service.

In case of a corporate user, account is registered for each person in charge in the corporation (for example, a person in the general affairs division or purchase division). Possessed apparatus is information on an apparatus (main part) possessed by a user concerned. In case of a user who does online shopping only and does not make a deal in a store, a product sold in the past through online shopping is set. On the other hand, in case of a corporate user who uses both of deals through online shopping and in a store, information on the possessed apparatus is set based on logs of both of selling in a store and selling through online shopping. The number of persons in charge may be plural, and login account is set in accordance in number with the number of persons in charge. As to customer rank, salesperson in charge, recommended product, message from salesperson in charge, delivery place code, and area code which are set in case of a corporation, the same information as set in the customer DB 211 in the in-store DB system 21 is set. Further, the customer DB 251 stores corporation information (same as the customer DBs 211 and 232) shown in FIG. 7B.

The web page material DB 252 stores images of various materials for creating a web page. For example, the web page material DB 252 stores a facial image of each salesperson in charge, images of products, catchphrases, various kinds of forms, etc.

The web page DB 253 stores various web pages necessary for providing an online shopping service.

The product DB 254 is a database of products handled in this online shopping, and has the same structure as that of the product DB 231.

The sales DB 255 has the same structure as that of the sales DB 212 (FIG. 3C) of each store, and sales information is registered therein in unit of each business transaction.

The order DB 256 stores data regarding an order in online shopping.

The related product DB 257 has copied thereinto only information regarding products handled in the online shopping service, of the related product information registered in the related product DB 233 of the master DB system 23.

The manual DB 258 stores operation manuals or user manuals for a plurality of apparatuses in electronic data.

The news DB 259 stores, for example, news provided through various news sources on the internet and news input from the shopping server 15 genre by genre.

Figure 8:
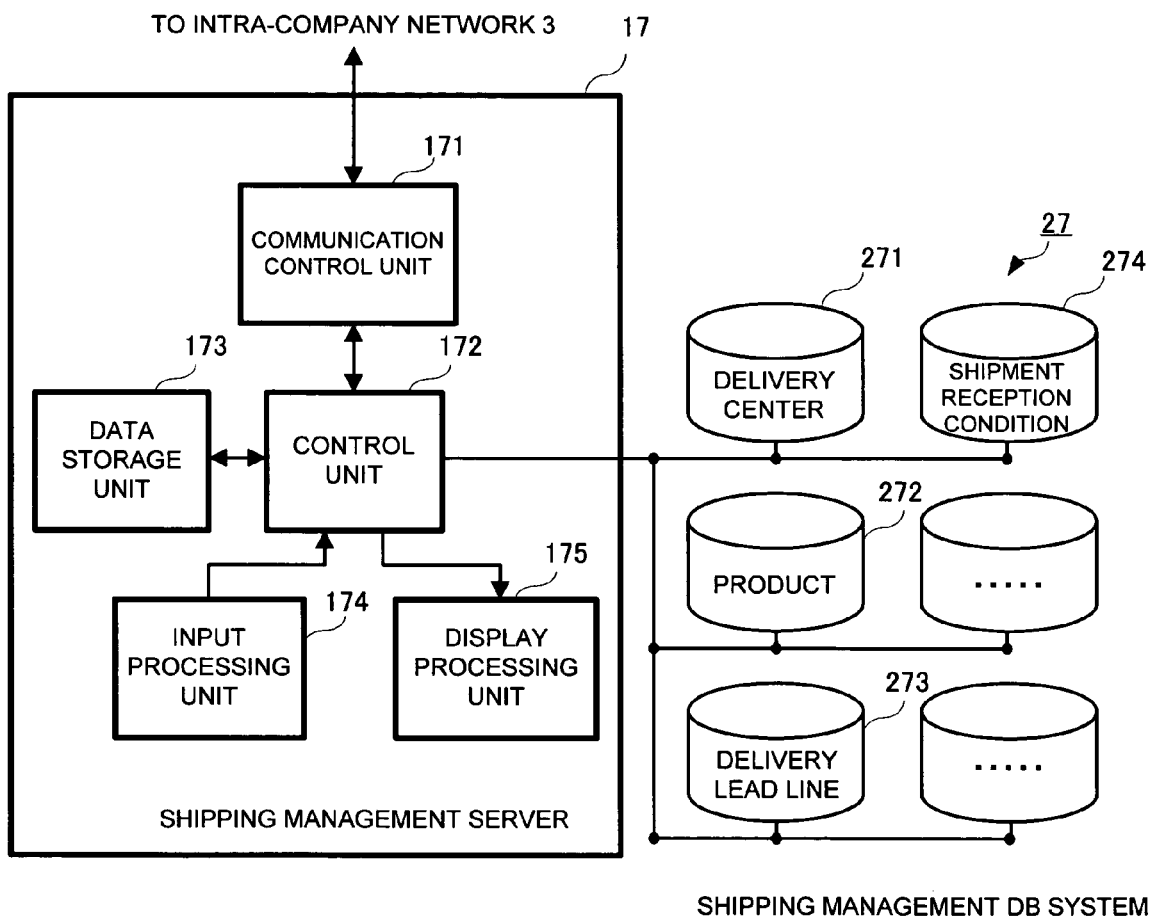
FIG. 8 is a diagram showing structures of a shipping management server and a shipping management DB.

The shipping management server 17 and the shipping management DB 27 system shown in FIG. 1 are systems for arranging delivery and managing stocks in response to reception and placement of orders, and have structures shown in FIG. 8.

As shown in FIG. 8, the shipping management server 17 comprises a communication control unit 171, a control unit 172, a data storage unit 173, an input processing unit 174, and a display processing unit 175.

The structures and functions of the communication control unit 171, control unit 172, data storage unit 173, input processing unit 174, and display processing unit 175 are basically the same as the structures and functions of the communication control unit 111, control unit 112, data storage unit 113, input processing unit 114, and display processing unit 115 of the in-store terminal 11. However, note that the functions of the control unit 172 include functions necessary for processing reception and placement of orders, managing stocks, specifying dates of delivery, etc.

As shown in FIG. 8, the shipping management DB 27 system comprises a delivery center DB 271, a product DB 272, a delivery lead time DB 273, and a shipment reception condition DB 274.

As shown in FIG. 9A, in the delivery center DB 271, priority levels are set for delivery centers belonging to the business organization on the basis of delivery-place-code by delivery-place-code, so that the shipping management server 17 can determine a delivery center that will ship a product to the delivery place.

As shown in FIG. 9B, the product DB 272 stores information indicating a delivery center that can ship each product on the basis of a product code assigned to each product. In the example shown in FIG. 9B, "OK" is indicated for a delivery center that can ship a product corresponding to a given product code, and a section is left blank for a delivery center that can not ship the product.

As shown in FIG. 9C, in the delivery lead time DB 273, the number of days required for a product to reach the order placer after shipment of the product from each delivery center is set for each area code corresponding to the address of the product delivery destination.

As shown in FIG. 9D, the shipment reception condition DB 274 is a DB for confirming a stock condition and shipment reception condition of a product, and information such as number in stock, planned next shipment reception date, planned amount of shipment, etc. are set for each product code. Further, in the shipment reception condition DB 274, information indicating whether a product is in stock or out of stock ("in stock"/"waiting for shipment reception") and information indicating whether there is any shipment reception plan or not (planned/unplanned) may be set. Note that a value may be set for number in stock and planned amount of shipment on the basis of each delivery center belonging to the business organization.

[Operation]

Next, a business activity of the business organization utilizing the system having the above-described structure will be explained.

[Operation at a Store]

Each salesperson in charge at each store keeps in contact with customers on a daily basis to sell products and seek new customers.

When there is a new sales (order), the person in charge at the store registers the content of the sales (order) in the sales DB 212 in the in-store DB system 21 via the in-store terminal 11. At this time, one transaction number is set for a plurality of products traded in one business transaction. Further, in a case where a new customer is achieved by a salesperson, the salesperson registers information regarding the customer in the customer DB 211.

For a corporation in the charge of a salesperson, the salesperson in charge suitably sets the customer rank of the corporation (degree of excellence as a customer), a recommended product suitable for the customer, a message for the customer, etc.

The master server 13 accesses the in-store DB system 21 of each store and the shopping DB system 25 in the midnight for example, to read out updated information (difference data), and updates the master DB system 23 based on the data. Due to this, for example, sales information of the day concerned is registered in the sales DB 234. Further, in a case where main apparatuses (products corresponding in product category to main product) possessed by each customer are increased due to this sales, this information is added in the section of "possessed product" in the customer DB 232. Furthermore, in a case where the customer information is changed or in a case where a new customer is achieved, the master server 13 updates the customer DB 232.

Further, the master server 13 sets customer rank of a corporate customer, recommended product, message from salesperson in charge, etc. collected from the customer DB 211 of each store in the online user DB 251 of the shopping DB system 25 via the shopping server 15. Further, the master server 13 generates related product information based on the contents of the updated sales DB 234, and sets the generated information in the related product DB 233. Furthermore, of the updated related product information, the master server 13 records only information regarding online shipping in the related product DB 257 via the shopping server 15.

[Online Shopping Service]

[Prior Registration]

In order for a corporate customer to use the online shopping service, it is necessary for the corporate customer to be registered beforehand at a store or the like. The corporate customer writes registration to online shopping in a registration application form or the like in the presence of a salesperson in charge, and applies for registration via the salesperson in charge. There may be a plurality of persons in charge in one corporation, and the login accounts are set correspondingly in the number to the number of persons in charge. The information written in the registration application form is forwarded to the manager of the shopping server 15 and registered in the online user DB 251 shown in FIG. 7. Here, information such as customer rank, etc. is set at the value determined by the salesperson in charge in order to secure match with services provided at each store. These processes are performed between the salesperson in charge at each store and the manager of the shopping server 15 by getting in contact with each other.

On the other hand, an individual customer accesses a user registration web page in a site operated by the shopping server 15 from the customer's own client terminal 31 via an unillustrated ISP (Internet Service Provider) and the internet 2. Then, the customer registers his/her e-mail address, address/name, payment method, etc. via this user registration web page. A password is issued for the registered individual. The shopping server 15 affixes a user ID to these information pieces, and registers them in the online user DB 251.

[Operation for Online Shopping]

Next, an operation of a case where online shopping is actually done will be explained.

Figure 10:
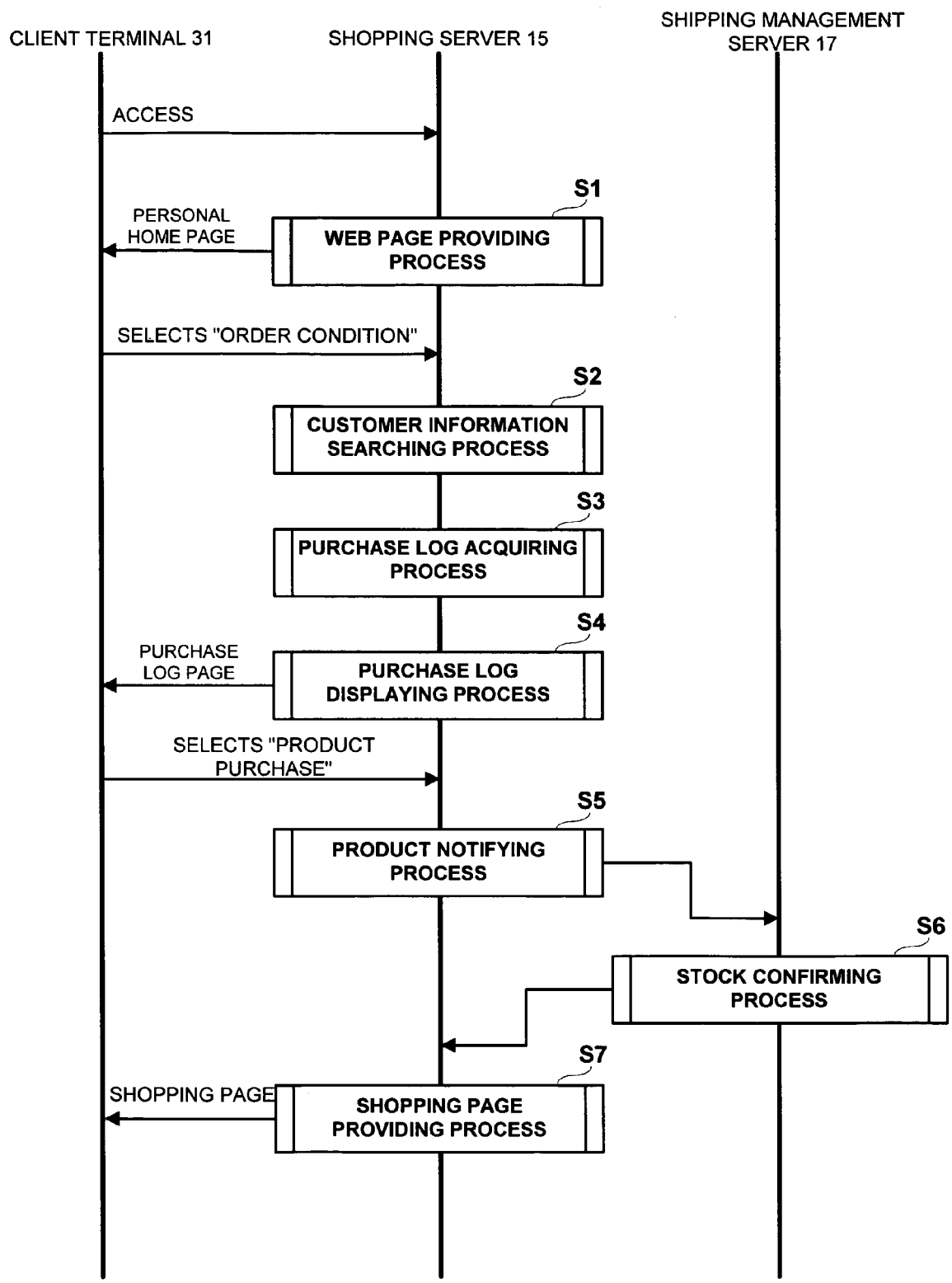
FIG. 10 is a diagram for explaining a process till a shopping page is displayed in response to an access from a client terminal.

An arbitrary user can access a login screen of a web page provided by the shopping server 15 from the user's own client terminal 31 via the internet. In response to the access by the client terminal 31, the shopping server 15 starts a process of FIG. 10 to perform a web page providing process (step S1). This web page providing process is a process for determining whether or not to permit the login based on the information entered from the client terminal 31 and for displaying a personalized page prepared user by user in a case where the login is permitted.

Figure 11:
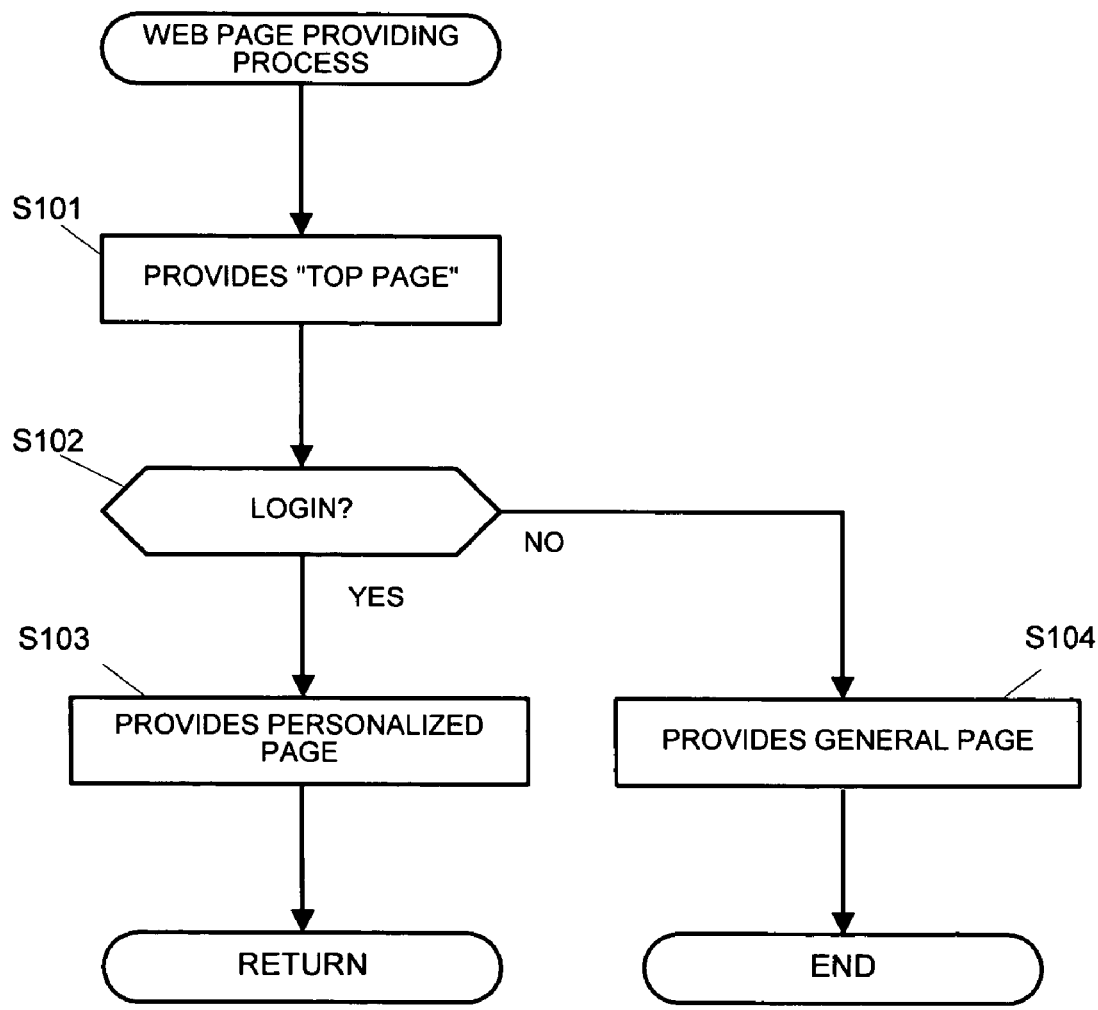
FIG. 11 is a flowchart for explaining a web page providing process shown in FIG. 10.

The web page providing process of step S1 will now be specifically explained. FIG. 11 is a flowchart specifically showing the web page providing process performed by the shopping server 15 in step S1. In the web page providing process, first, the shopping server 15 reads out a top page, which is a page (information in HTML format) shown in FIG. 12 for entering a login name and a password, from the web page DB 253, and sends the page to the client terminal 31 so that the page is displayed (step S101).

In this page, an input section for entering a login account (e-mail address/password) is provided.

The user enters the login account from this screen, and clicks "GO!", thereby the entered information is notified to the shopping server 15 via the internet 2.

The shopping server 15 determines whether or not there is a request for logging in a personalized page based on the instruction from the terminal 31 (step S102). In a case where there is no input of a login account or the input login account is imperfect (step S102: No), the shopping server 15 provides a general page other than the personalized page (step S104).

On the contrary, in a case where there is a login request (step S102: Yes), the shopping server 15 causes the client terminal 31 to display the personalized page (step S103). More specifically, the shopping server 15 reads out the salesperson in charge at the store that is in charge of this customer, the customer rank, the possessed apparatus, the recommended product, and a message from the salesperson in charge from the online user DB 251. Next, the shopping server 15 reads out an image of the salesperson in charge and an image of the recommended product from the web page material DB 252. After this, the shopping server 15 specifies a supply product adaptable to the apparatus possessed by the logging-in user based on the information on the possessed apparatus and the relation information stored in the related product DB 257, and further reads out information regarding the supply product from the web page material DB 252.

Next, the shopping server 15 arranges these information pieces to create such a web page as shown in FIG. 13, and sends it to the client terminal 31 so that this page is displayed. When the personalized page is displayed on the client terminal 31 in this way, the web page providing process is completed.

As shown in FIG. 13, the personalized page is divided into two left and right frames, and items for navigating this site are arranged in the left frame. Further, a message for the customer from the salesperson in charge is arranged in the upper left side of the right frame, information regarding the salesperson in charge who is in charge of this user is displayed in the upper right side of the right frame, and images of the products which the salesperson in charge recommends to the customer and various information such as a notice, service information, etc. are presented below the message and the salesperson's information.

Figure 14:
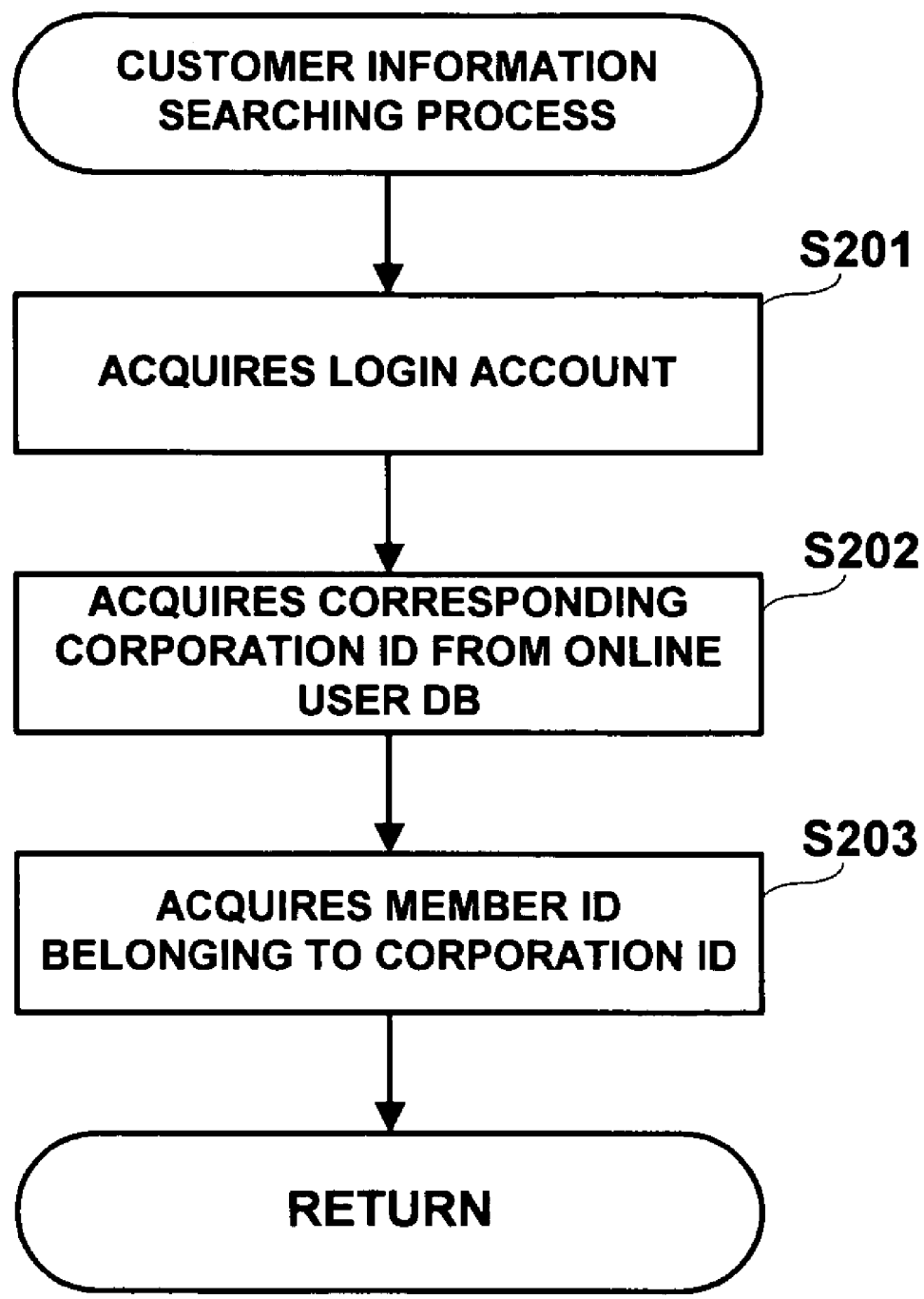
FIG. 14 is a flowchart for explaining a customer information searching process shown in FIG. 10.

When "order condition" is selected by the client terminal 31 from the navigation display in the left frame, the shopping server 15 performs a customer information searching process (step S2). The detail of the customer information searching process will be explained with reference to a flowchart of FIG. 14.

First, the control unit 152 of the shopping server 15 acquires the login account entered in step S102 (step S201).

The control unit 152 accesses the online user DB 251, and acquires corporation ID information corresponding to the browser concerned based on the login account acquired in step S201 (step S202). The corporation ID is information indicating a corporation, a division, etc. to which the browser concerned belongs.

The control unit 152 further acquires a user ID of a user having the same corporation ID as the corporation ID acquired in step S202 (step S203). That is, the control unit 152 selects another user who belongs to the same division as the browser.

Figure 15:
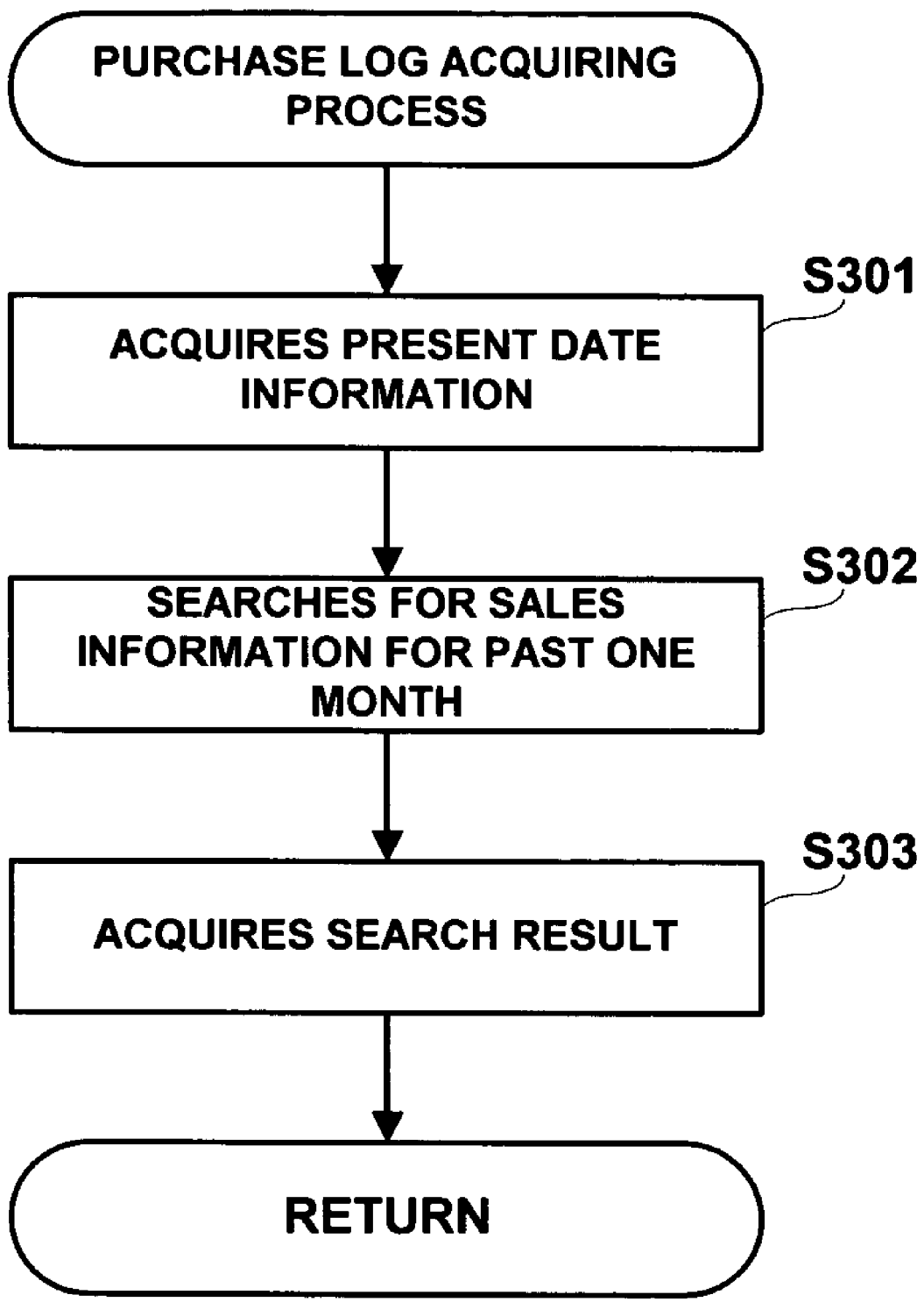
FIG. 15 is a flowchart for explaining a purchase log acquiring process shown in FIG. 10.

Successively, the control unit 152 performs a purchase log acquiring process (step S3). The detail of the purchase log acquiring process will be explained with reference to a flowchart of FIG. 15.

First, the control unit 152 acquires information indicating the present date from, for example, a predetermined timer circuit or the like (step S301).

Next, the control unit 152 accesses the sales DB 255, and searches for sales information of the user based on the user ID acquired in step S203. At this time, the control unit 152 searches for sales information dating back from the present date by a predetermined period (for example, one month) based on the present date information acquired in step S303 (step S302), and acquires a search result i.e. sales information corresponding to this condition (step S303).

Figure 16:
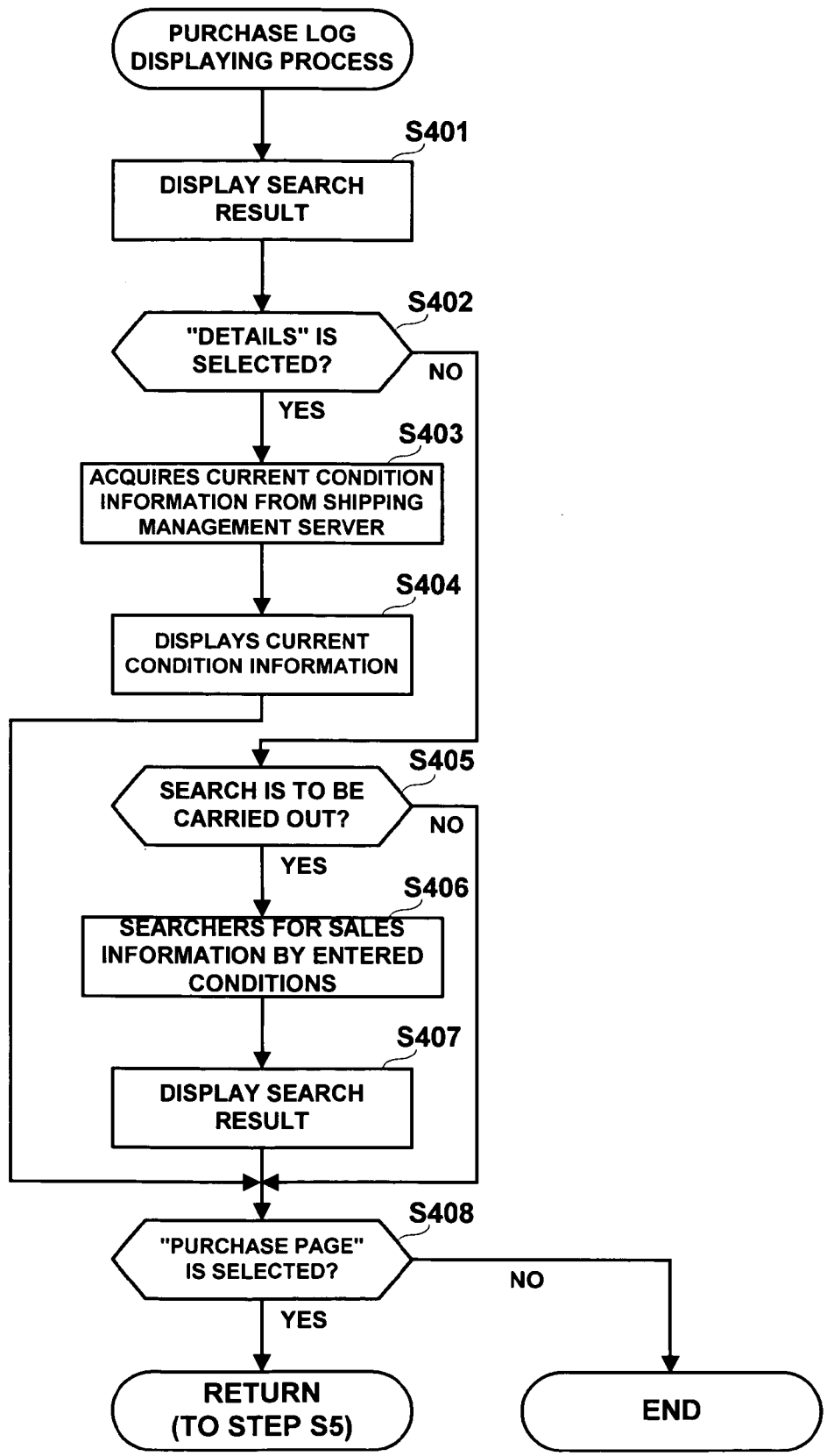
FIG. 16 is a flowchart for explaining a purchase log displaying process shown in FIG. 10.

The control unit 152 successively performs a purchase log displaying process (step S4). The detail of the purchase log displaying process will be explained with reference to a flowchart of FIG. 16.

The control unit 152 creates a web page including the search result acquired in step S303 (hereinafter referred to as "purchase log page"), and sends it to the client terminal 31 (step S401). A display example of the purchase log page is shown in FIG. 17.

As illustrated, the name of the browser and the division to which he/she belongs are displayed in the purchase log page, and information (order number, date of order, product name, order placer, price, etc.) based on the sales information acquired in step S303 is also displayed in a list format in this page. "Details" is displayed in, for example, a hyperlink format in a comment section of this list, and the page is jumped to a page showing the detailed information on the ordered product concerned by clicking each "details".

That is, when this "details" is selected (step S402: Yes), the control unit 152 inquires of the shipping management server 17 the current condition of the ordered product concerned, and acquires information showing the current condition (hereinafter referred to as "current condition information") (step S403). Here, the current condition information includes information such as details of the order, delivery place, bill sendee, etc. That is, the control unit 172 of the shipping management server 17 acquires corresponding information from the shipping management DB 27 system in response to the inquiry from the control unit 152 of the shopping server 15.

The control unit 152 of the shopping server 15 creates a web page including the information representing the current condition information acquired from the shipping management server 17 (hereinafter referred to as "order condition page"), and sends it to the client terminal 31 (step S404).

A display example of this order condition page is shown in FIG. 18. As illustrated, the information based on the current condition information acquired in step S403 is displayed.

Meanwhile, as shown in FIG. 17, a search screen is also displayed in the lower section of the purchase log page. Various text boxes and pull-down menu for entering search conditions are prepared in the search screen. If the browser wants to check other purchase logs than the purchase log displayed in the list in the purchase log page, the browser enters desired conditions in the search screen to carry out search. That is, when a "search" button is clicked (step S405: Yes), the control unit 152 of the shopping sever 15 searches the sales DB 255 using the entered conditions (step S406).

The control unit 152 creates a web page including information showing the search result (in the same display format as the purchase log page shown in FIG. 17), and sends it to the client terminal 31 (step S407).

Further, as shown in FIGS. 17 and 18, an indication of navigation to a "product purchase page" is displayed in, for example, a hyperlink format in the lowermost section of each of the purchase log page (including the search result page)

and the order condition page. When this navigation indicator is clicked (step S408: Yes), a product notifying process in step S5 will be performed. On the other hand, if jump to the product purchase page is not selected, the display remains in the purchase log page (step S408: No).

Figure 19:
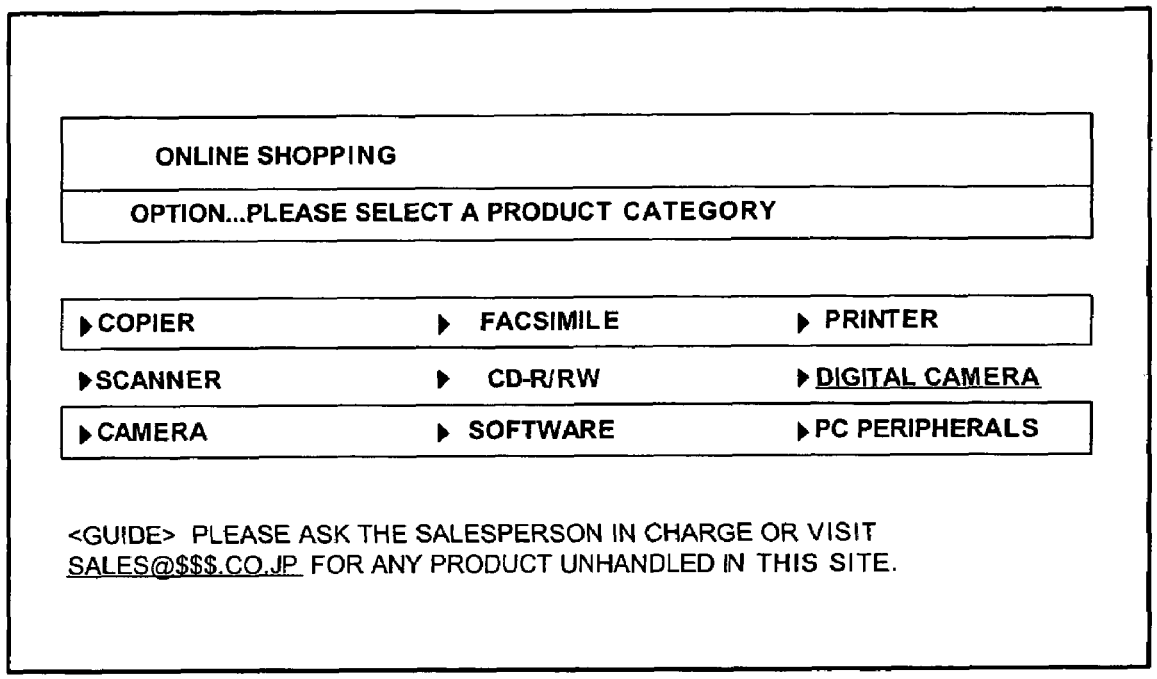
FIG. 19 is a diagram showing a display example of a product purchase page displayed in the purchase log displaying process shown in FIG. 16.

In a case where selecting the product purchase page, the user can designate a product he/she wants to purchase by means of, for example, a shopping handcart model. As shown in FIG. 19, the product purchase page is a page showing handled products category by category in a list. When the user selects any of the categories (product categories), the shopping server 15 notifies products registered in the selected product category to the shipping management server 17 by performing the aforementioned product notifying process of step S5.

Figure 20:
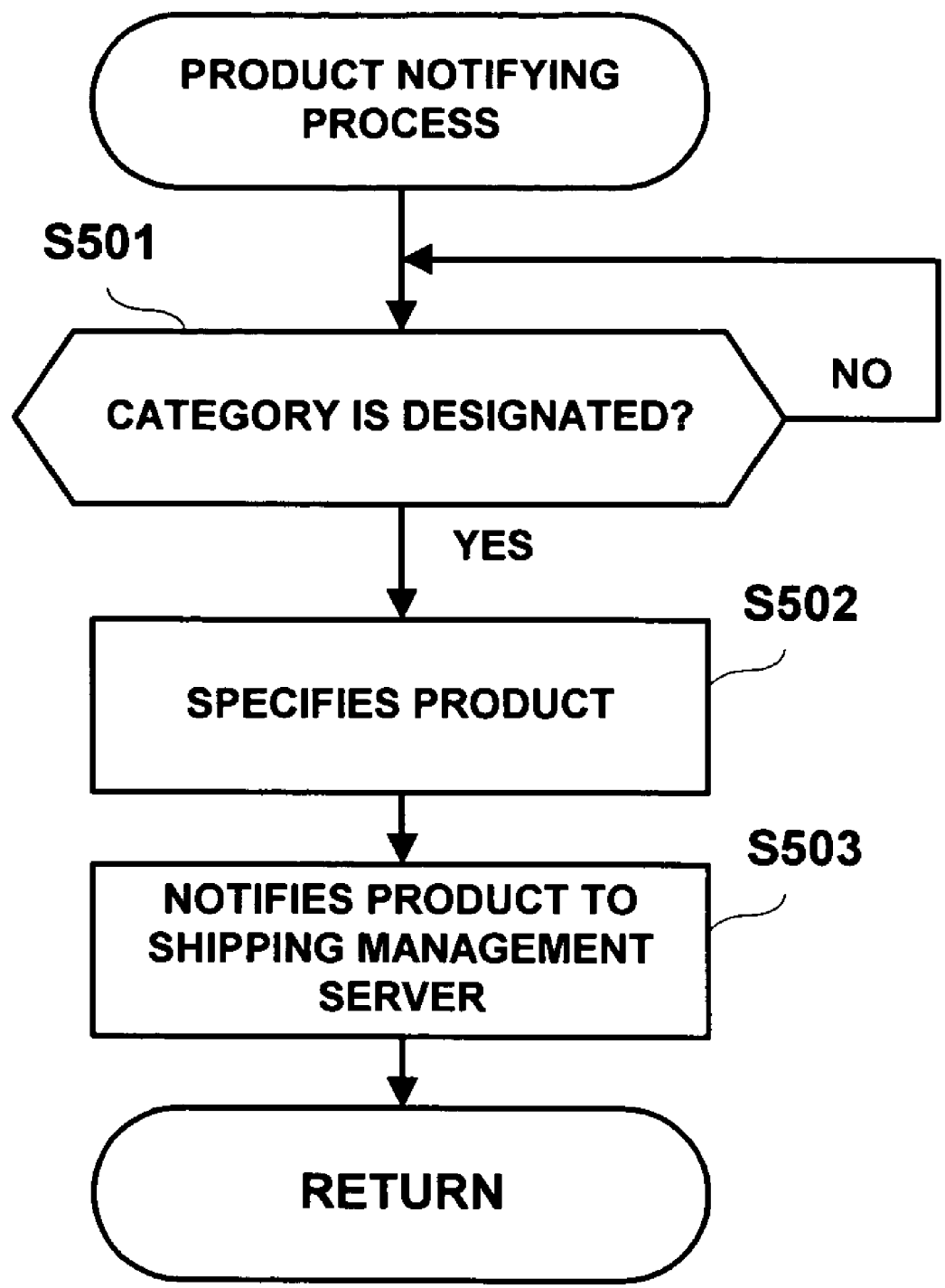
FIG. 20 is a flowchart for explaining a product notifying process shown in FIG. 10.

Next, the product notifying process of step S5 will be explained in detail. FIG. 20 is a flowchart for explaining the product notifying process performed by the shopping server 15 in step S5. In the product notifying process, the shopping server 15 determines whether selection of a product category is made or not (step S501), and waits by repeating the procedure of step S501 in a case where no selection is made.

If selection of a product category is made, the shopping server 15 searches the product DB 254 to perform such a procedure as extracting a product code of a product included in the selected product category. By performing this procedure, the shopping server 15 specifies a product belonging to the selected product category (step S502).

After selecting a product belonging to the selected product category, the shopping server 15 notifies the extracted product code to the shipping management server 17 (step S503). When notification of the product to the shipping management server 17 is completed, the product notifying process is finished.

Figure 21:
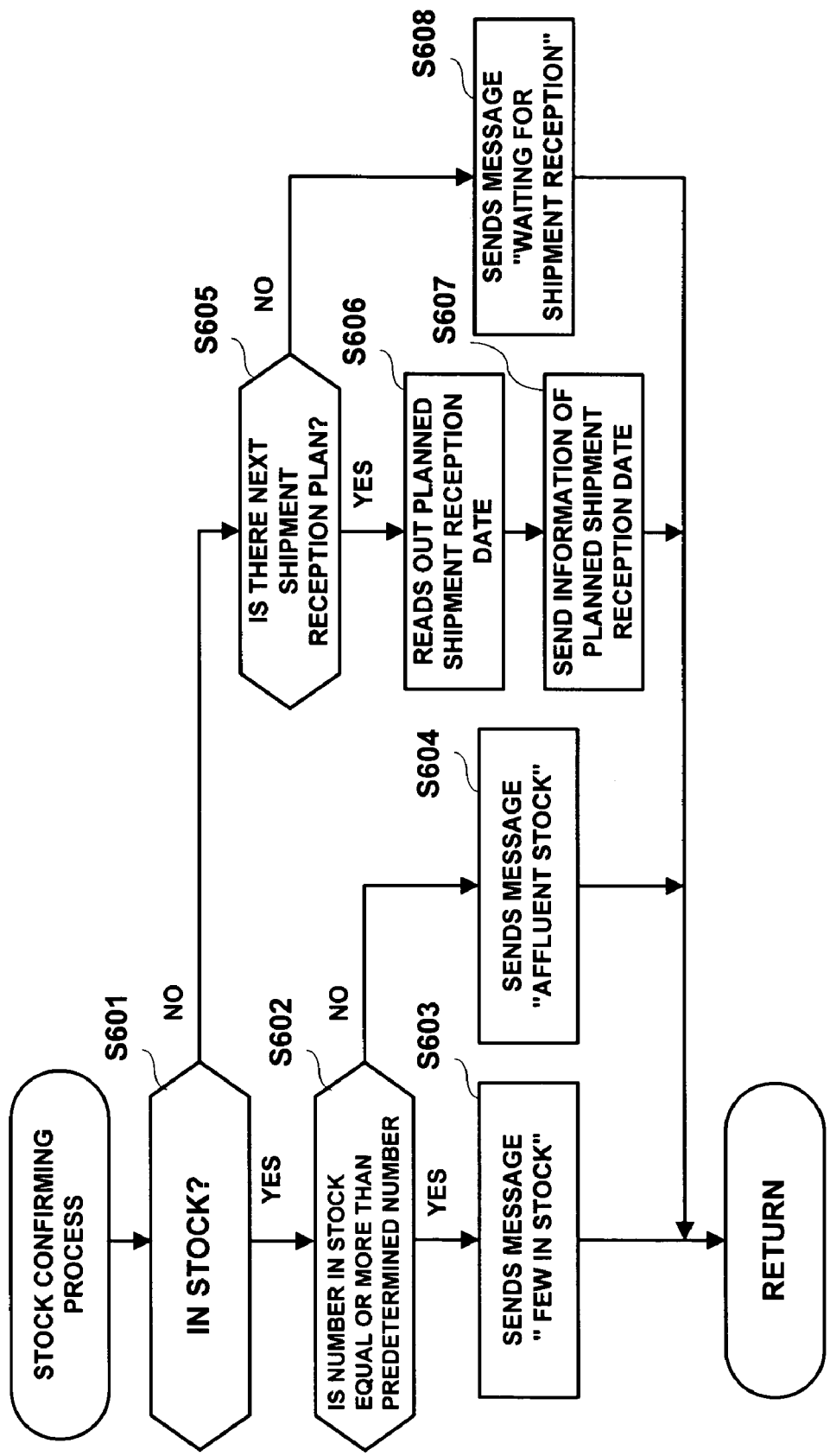
FIG. 21 is a flowchart for explaining a stock confirming process shown in FIG. 10.

Next, a stock confirming process of step S6 will be specifically explained. FIG. 21 is a flowchart for explaining the stock confirming process performed by the shopping server 15 in step S6. The stock confirming process is performed in response to that the shipping management server 17 receives the notification of the product from the shopping server 15.

When the stock confirming process is started, the shipping management server 17 determines whether or not each product notified by the shopping server 15 is in stock or not (step S601). It can be confirmed whether the product is in stock or not, by specifying the product notified by the shopping server 15 by searching the shipment reception condition DB 274 and checking "stock condition" corresponding to the specified product.

In case of a product that is secured in stock, the shipping management server 17 further checks "number in stock" corresponding to the product to determine whether the number of the product units in stock is equal to or smaller than a preset predetermined number (step S602). In a case where the number in stock is equal to or smaller than the predetermined number, the shipping management server 17 associates a message such as "few in stock" with the product code, and sends it to the shopping server 15 (step S603). On the contrary, in a case where the number in stock exceeds the predetermined number, the shipping management server 17 sends a message "affluent stock" to the shopping server 15 (step S604).

In case of a product that is out of stock, the shipping management server 17 checks "next shipment reception plan" corresponding to the product, and determines whether or not there is a plan for receiving shipment of the product (step S605). In a case where there is a plan for receiving shipment, the shipping management server 17 reads out information indicating a planned shipment reception date from "planned shipment reception date" corresponding to the product (step S606), and associates the read-out information with the product code to send it to the shopping server 15 (step S607). On the contrary, in a case where there is no plan for shipment reception, a message such as "waiting for shipment reception" is sent to the shopping server 15 (step S608). When the shipping management server 17 finishes the sending of the information and messages notifying the stock condition, shipment reception plan, etc. for each product notified by the shopping server 15 in this manner, the stock confirming process is completed.

Figure 22:
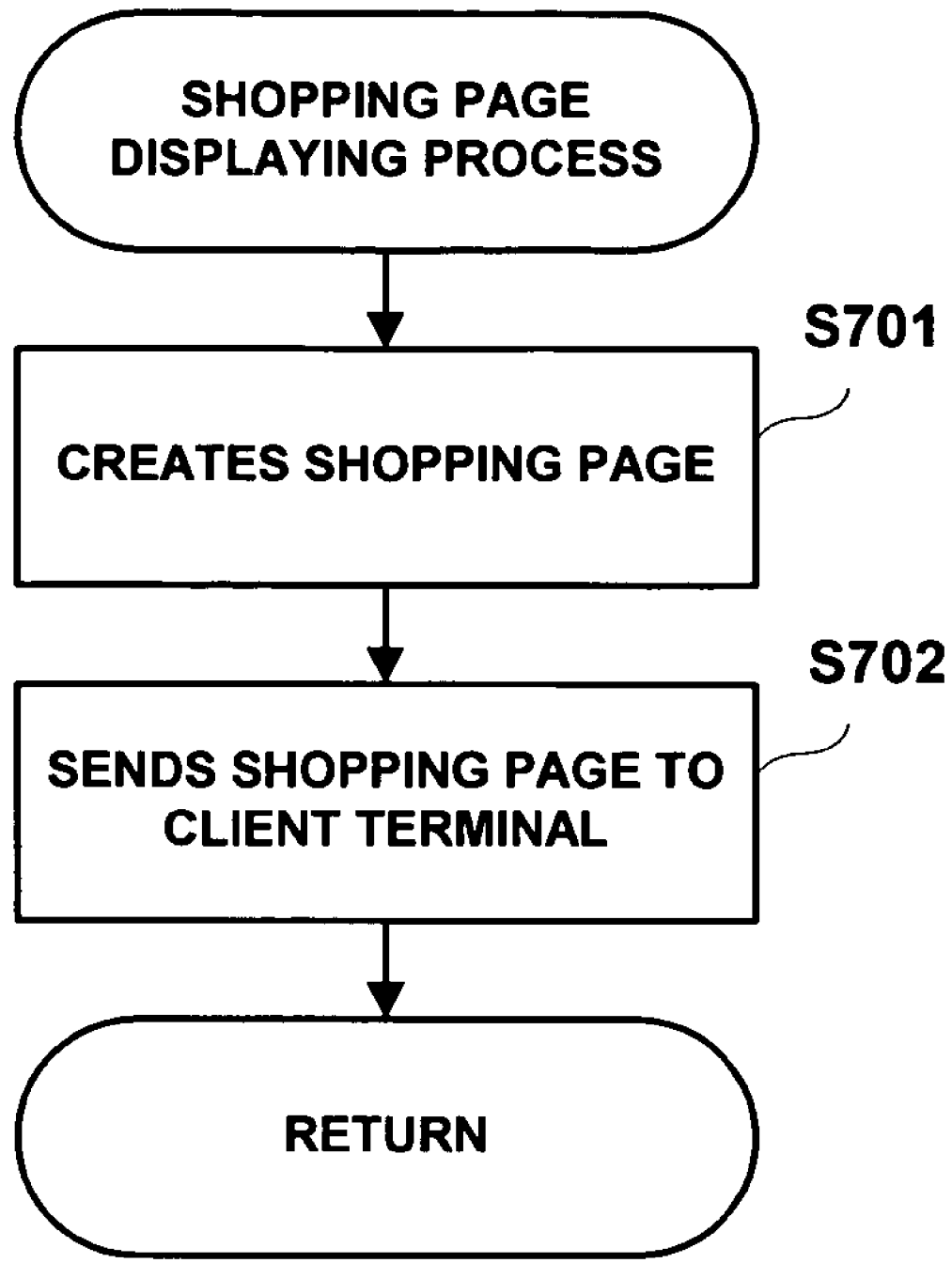
FIG. 22 is a flowchart for explaining a shopping page displaying process shown in FIG. 10.

Next, a shopping page displaying process of step S7 will be specifically explained. FIG. 22 is a flowchart for explaining the shopping page displaying process performed by the shopping server 15 in step S7. The shopping page displaying process is performed in response to that the shopping server 15 receives the information and messages notifying the stock condition, shipment reception plan, etc. from the shipping management server 17.

When the shopping page displaying process is started, the shopping server 15 creates a shopping page, such as by reading out information on the products belonging to the product category selected in the above-described product notifying process of step S5 from the web page material DB 252 (step S701). At this time, the shopping server 15 adds information indicating the stock condition, etc of each product to the shopping page, based on the information and messages received from the shipping management server 17. Furthermore, for products with the information indicating a planned shipment reception date and message "waiting for shipment reception" from the shipping management server 17, the shopping server 15, for example, adds an image "to salesperson in charge" which is linked to a page for enabling execution of a process for contacting the salesperson in charge, in order to create a shopping page corresponding to the stock condition of the product.

Further, the shopping server 15 acquires a discount rate corresponding to the customer rank read out from the online user DB 251 in step S103 of the above-described web page providing process. In the shopping page, an offer price with the discount rate taken into consideration (standard price×(1−discount rate)) is displayed at a predetermined location corresponding to the product on sale.

The shopping server 15 sends the created shopping page to the client terminal 31 so that the page is displayed (step S702). Accordingly, such a shopping page as shown in FIG. 23 is displayed on the client terminal 31, making it possible to enter an instruction for purchasing each product.

In the shopping page shown in FIG. 23, for information on each product, information such as, for example, "few in stock", "shipment reception planned on January 25th", and "waiting for shipment reception" indicating the stock condition, shipment reception plan, etc. of the product is displayed for each product. Note that for a product with a message "affluent stock" received, no particular information indicating the stock condition needs to be displayed, Further, an image "to salesperson in charge" is displayed for the product with information such as a planned shipment reception date and "waiting for shipment reception". The user can contact the salesperson in charge by clicking the image "to salesperson in charge" set for the product the user wants to purchase to send an email to the salesperson in charge, making it possible to make a reservation for product purchase, etc.

Figure 24:
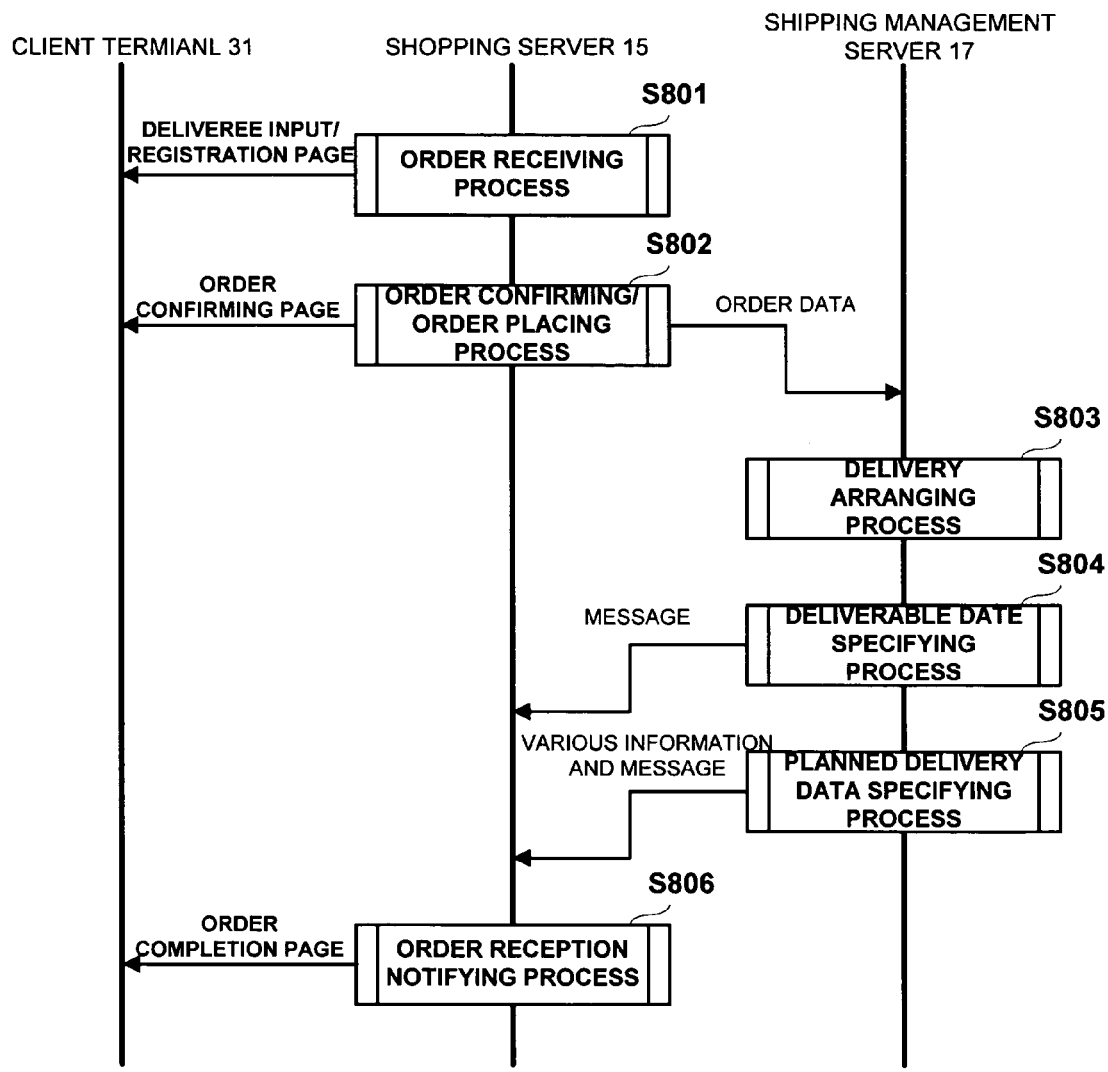
FIG. 24 is a diagram for explaining a process till an order completion page is displayed in response to an instruction from a client terminal.

After this, the shopping server 15 starts a process of FIG. 24 to perform an order receiving process (step S801). This order receiving process is a process for receiving an order for a product in response to that the user conducts a procedure via the client terminal 31 for instructing that the user will purchase the product.

In this process, an order for a product which is designated by selecting "put in cart" is received through the shopping page shown in FIG. 23. In this case, for example, such a page as shown in FIG. 25 indicating the contents of the cart is sent to the client terminal 31. By the client terminal 31 selecting "to order procedure", information designating the products put in the cart is notified to the shopping server 15, thereby the order is received.

When receiving an order, the shopping server 15 performs an order confirming/order placing process (step S802). In this process, such a page as shown in FIG. 26 that is necessary when making an order such as delivery place, payment method, etc. is sent to the client terminal 31, and at the same time information (order data) designating the ordered products is notified from the shopping server 15 to the shipping management server 17.

Upon notification of the order data, the shipping management server 17 performs a delivery arranging process (step S803), a deliverable date specifying process (step S804), and a planned delivery date specifying process (step S805) sequentially.

In the delivery arranging process, the shipping management server 17 specifies a delivery center that has a stock of the ordered products based on the information recorded in the shipping management DB 27 system to perform a process for arranging the delivery of the ordered products, and also performs a process for assigning the stock in accordance with the contents of the order.

In the deliverable date specifying process, the shipping management server 17 specifies a date and time on and at which the ordered product can be delivered, based on the planned shipment reception date for each product and the lead time of each delivery center.

In the planned delivery date specifying process, the shipping management server 17 specifies a planned delivery date in accordance with conditions such as a desired delivery date and time designated by the user, and notifies the date to the shopping server 15.

The shopping server 15, which has received the notification of a product delivery date as a result of the performance of the planned delivery date specifying process, performs an order reception notifying process (step S806), to create screen information (FIG. 27) that can present the planned delivery date for each ordered product and send it to the client terminal 31, so that the created information can be displayed on the screen of the client terminal 31.

As explained above, according to the present embodiment, when a user who has registered a corporation ID uses the online shopping system, the user can check order placement log (purchase log) made by users having the same corporation ID. Accordingly, when the user purchases an article necessary for a work unit, division, section, group, etc. which is an organizational unit of a corporation, the user can place an order after checking the order placement log, making it possible to prevent a duplicate order, etc. and to perform an effective order placement process.

The present invention is not limited to the above-described embodiment, but various modifications and applications thereof are available. For example, according to the above-described embodiment, the store system and online shopping system for selling articles are united. However, the targets of selling are arbitrary, and a similar system can be applied to, for example, a store system and online system for providing digital contents (video, music, etc.), services, etc.

Further, the structures of the servers and DBs may be arbitrarily changed. For example, in FIG. 1 and FIG. 2, it has been explained that one in-store terminal 11 is installed in each store for easier understanding. However, a plurality of in-store terminals connected to a LAN or the like may be installed in each store. The master server 13 and the shopping sever 15 may be constituted by a plurality of servers that work in cooperation. Further, the structures of the DBs are not limited to the above-described structures. Two or more DBs may be united, or one DB may be functionally divided into plurality. Further, setting of redundant data may be omitted. For example, relations between main parts, and options and supply products may not be set in the related product DB 233 in the above-described embodiment, but these relations may be specified based on the contents of the product DB 231.

Further, the related product DB 233 may not be provided, so that information regarding related products may be processed by the related product DB 257. Likewise, link information for products may not be stored in the product DB 231, so that the link information may be set only in the product DB 254.

All parts or some parts of a program required for a computer or computers to function as the above-described system or to perform the above-described processes may be recorded on a recording medium (a ROM, a flexible disk, a hard disk, a CD-ROM, an MO, a CD-R, a flash memory) or the like so that the program may be distributed and circulated. Further, all parts or some parts of a signal for controlling a computer or computers as the above-described system or controlling a computer or computers to perform the above-described processes may be provided by a carrier wave.

The above description is intended for illustration, and not intended for limitation. Many other embodiments and many other ways of use than the provided example will become known to those skilled in the art upon reading of the above description. Accordingly, the scope of the present invention must be determined not by referring to the above description, but in accordance with all the scope of equivalence within which the claims below are granted a right.

This application is based on Japanese Patent Application No. 2001-356691 filed on Nov. 21, 2001 and including specification, claims, drawings and summary. The disclosure of the above Japanese Patent Application is incorporated herein by reference in its entirety.

The invention claimed is:

1. A network system for providing a site for selling a product based on information entered by a terminal connected to a network, said network system comprising:

an order placement information storage unit which stores order placement information representing a content of an order placed from said terminal in association with operator information for identifying an operator of said terminal;

an identification information storage unit which stores organization information for identifying an organization to which the operator belongs in association with operator information regarding an operator who belongs to the organization;

a specifying unit which specifies the organization information corresponding to the operator of said terminal which has been permitted to log in to said site operators associated with the organization information, by referring to said identification information storage unit;

an order placement information acquiring unit which collectively acquires order placement information associated with the operator of said terminal and order placement information associated with the operator information specified by said specifying unit, by searching said order placement information storage unit;

an order placement information notifying unit which provides notification of the order placement information acquired by said order placement information acquiring unit to said terminal which has been permitted to log in and, subsequent to a display of said order placement information by said terminal, providing an indication of navigation to a products purchase page for display by said terminal, said products purchase page allowing the operator to provide said order placement information representing said content of said order; and an operator selection means providing unit which provides said terminal with selection means for selecting at least one operator among operators corresponding to operator information specified by said specifying unit, wherein said order placement information acquiring unit searches said order placement information storage unit to acquire order placement information associated with operator information of the operator selected by said selection means and other operators in association with the organization information specified by said specifying unit from said terminal.

2. The network system according to claim 1, wherein said order placement information acquiring unit acquires order placement information indicating past order placements within a predetermined period from the current date.

3. The network system according to claim 1, wherein the order placement information includes at least article information for identifying an ordered article, quantity information indicating an ordered quantity, price information indicating a price of the ordered article, order placement date information indicating an order placement date, and deliveree information indicating a delivery of the ordered article.

4. The network system according to claim 3, further comprising search condition providing unit which provides said terminal with condition selection means for selecting a search condition for order placement information associated with operator information specified by said specifying unit, wherein said order placement information notifying unit presents on said terminal, order placement information stored in said order placement information storage unit and searched out by said order placement information acquiring unit based on the search condition selected by said condition selection means from said terminal.

5. The network system according to claim 4, wherein said condition selection means can select at least one of the article information, the order placement date information, and the deliveree information.

6. The network system according to claim 3, wherein said identification information storage unit further stores a rank indicating the degree of excellence of the operator or of an organization to which the operator belongs, and said network system, further comprising:

a calculation unit for calculating a discount rate for a product price indicated by the order placement information corresponding to the rank and adopting a price given by the product price multiplied by the discount rate as a new presentation price.

7. The network system according to claim 1, wherein said order placement information notifying unit specifies other products being sold concurrently with products indicated by the order placement information based on past order placement information stored in said order placement information storage unit and further notifies said terminal regarding the other products as related products of the products when a ratio of a number of concurrent sales of the products and the other products to a number of sales of the products is greater than or equal to a predetermined value.

8. A method of providing online shopping comprising:

storing user information for identifying a user in association with organization information for identifying an organization to which the user belongs;

storing order placement information indicating a content of an order placed from a terminal connected to a network in association with user information of an order placer;

specifying, when the user accesses a shopping site via said network, corresponding organization information based on the user information entered from said terminal, and specifying user information of an order placer, and another user associated with the specified organization information, accessing the shopping site; and collectively acquiring order placement information by a control unit; acquiring order placement information associated with user information of the order placer and another user in association with the specified organization information from said terminal, and providing notification of the acquired order placement information to said terminal as information indicating a purchase log of an organization corresponding to the specified organization information; and, subsequent to a display of said order placement information by said terminal, providing an indication of navigation to a products purchase page for display by said terminal, said products purchase page allowing the operator to provide said order placement information representing said content of said order, and, providing said terminal with selection means for selecting at least one operator from among operators corresponding to the specified operator information.

9. A purchase log presenting method which is applied to a network system for providing a product selling service based on information entered from a terminal connected to a network, said method comprising:

a user registering step of performing user registration by registering user information for identifying a user of said service;

an organization information registering step of registering, in a case where the user registered in said user registering step uses the service as a member of an organization, organization information for identifying the organization in association with the user information;

an order placement information storing step of storing order placement information indicating a content of an order placed when the service is used, in association with user information of an order placer;

an organization information specifying step of specifying, when the user uses the service, corresponding organization information based on the user information;

a user information specifying step of specifying, in a case where organization information is specified in said organization information specifying step, user information regarding order placers, and another user associated with the specified organization information, using the service;

an order placement information notifying step of collectively acquiring, by a control unit, order placement information associated with the user using the service and order placement information associated with the user information specified in said user information specifying step from the order placement information stored in said order placement information storing step, and providing notification of the acquired order placement information to said terminal as information indicating a purchase log and, subsequent to a display of said order placement information by said terminal, providing an indication of navigation to a products purchase page for display by said terminal, said products purchase page allowing the operator to provide said order placement information representing said content of said order; and an operator selection means providing step of providing said terminal with selection means for selecting at least one operator among operators corresponding to operator information specified by said organization information specifying step, wherein said order placement information notifying step further comprises a searching step of searching the registered order placement information to acquire order placement information associated with operator information of the operator selected by said selecting means and other operators in association with the organization information specified by said user information specifying step from said terminal.

10. A server apparatus which is connected to a network and provides a site for selling a product in response to a request from a terminal connected to said network, said server apparatus comprising:

a connection unit which connects to said network;

an identification information storage unit which stores operator information for identifying an operator of said terminal in association with organization information for identifying an organization to which the operator belongs;

an order placement information storage unit which stores a content of an order placed from said terminal in association with operator information of an operator who has placed the order;

an order placement reception unit which receives a placed order for a product and receives operator information indicating an operator of a terminal which has sent the order, by controlling said connection unit;

an organization information acquiring unit which acquires from said identification information storage unit, organization information associated with the operator information based on the operator information received by said order placement reception unit;

an operator information acquiring unit which acquires from said identification information storage unit, operator information of the operator who has placed the order and another operator, associated with the acquired organization information based on the organization information acquired by said organization information acquiring unit;

an order placement information acquiring unit which collectively acquires from said order placement information storage unit, order placement information associated with the operator of said terminal and order placement information associated with the operator information acquired by said operator information acquiring unit;

an order placement information sending unit which sends the order placement information acquired by said order placement information acquiring unit to the terminal of the operator as purchase log information, by controlling said connection unit and, subsequent to a display of said order placement information by said terminal, providing an indication of navigation to a products purchase page for display by said terminal, said products purchase page allowing the operator to provide said order placement information representing said content of said order; and an operator selection means providing unit which provides said terminal with selection means for selecting at least one operator among operators corresponding to operator information acquired by said operator information acquiring unit, wherein said order placement information acquiring unit searches said order placement information storage unit to acquire order placement information associated with operator information of the operator selected by said selection means and another operator in association with the organization information acquired by said organization information acquiring unit from said terminal.

11. The server apparatus according to claim 10, wherein:

said order placement information sending unit presents a selection area for selecting at least one operator among operators corresponding to operator information acquired by said operator information acquiring unit, on said terminal; and said order placement information acquiring unit acquires from said order placement information storage unit, order placement information associated with operator information of the operator selected in said selection area.

12. The server apparatus according to claim 10, wherein said order placement information sending unit:

presents an input area for inputting a search condition for order placement information associated with operator information acquired by said operator information acquiring unit, on said terminal; and presents a result of search for the order placement information stored in said order placement information storage unit which is searched by said order placement information acquiring unit based on the search condition input in the input area, on said terminal.

13. The server apparatus according to claim 12, wherein:

the order placement information includes at least article information for identifying an ordered article, order placement date information indicating an order placement date, and deliveree information indicating a deliveree of the ordered article; and said order placement information acquiring unit searches said order placement information storage unit using at least one of the article information, the order placement date information, and the deliveree information as the search condition.

14. A computer-readable recording medium storing a program for controlling a computer, which is connected to a network and provides a site for selling a product in response to a request from a terminal connected to said network, to function as:

a connection unit which connects to said network;

an identification information storage unit which stores operator information for identifying an operator of said terminal in association with organization information for identifying an organization to which the operator belongs;

an order placement information storage unit which stores a content of an order placed from said terminal in association with operator information of an operator who has placed the order;

an order placement reception unit which receives a placed order for a product and receives operator information indicating an operator of a terminal which has sent the order, by controlling said connection unit;

an organization information acquiring unit which acquires from said identification information storage unit, organization information associated with the operator information based on the operator information received by said order placement reception unit;

an operator information acquiring unit which acquires from said identification information storage unit, operator information of the operator who has placed the order and another operator associated with the acquired organization information based on the organization information acquired by said organization information acquiring unit;

an order placement information acquiring unit which collectively acquires from said order placement information storage unit, order placement information associated with the operator of said terminal and order placement information associated with the operator information acquired by said operator information acquiring unit;

an order placement information sending unit which sends the order placement information acquired by said order placement information acquiring unit to the terminal of the operator as purchase log information, by controlling said connection unit and, subsequent to a display of said order placement information by said terminal, providing an indication of navigation to a products purchase page for display by said terminal, said products purchase page allowing the operator to provide said order placement information representing said content of said order, and an operator selection means providing unit which provides said terminal with selection means for selecting at least one operator among operators corresponding to operator information acquired by said operator information acquiring unit, wherein said order placement information acquiring unit searches said order placement information storage unit to acquire order placement information associated with operator information of the operator selected by said selection means and another operator in association with the organization information acquired by said organization information acquiring unit from said terminal.

* * * * *